(12) United States Patent
Ku et al.

(10) Patent No.: US 12,512,508 B2
(45) Date of Patent: Dec. 30, 2025

(54) ALL-SOLID-STATE SECONDARY BATTERY AND MANUFACTURING METHOD THEREFOR

(71) Applicant: SAMSUNG SDI CO., LTD., Yongin-si (KR)

(72) Inventors: Junhwan Ku, Suwon-si (KR); Seoksoo Lee, Suwon-si (KR); Youngsin Park, Suwon-si (KR); Toshinori Sugimoto, Suwon-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 462 days.

(21) Appl. No.: 18/013,079

(22) PCT Filed: Jul. 13, 2021

(86) PCT No.: PCT/KR2021/008961
§ 371 (c)(1),
(2) Date: Dec. 27, 2022

(87) PCT Pub. No.: WO2022/080628
PCT Pub. Date: Apr. 21, 2022

(65) Prior Publication Data
US 2023/0275261 A1    Aug. 31, 2023

(30) Foreign Application Priority Data
Oct. 12, 2020    (KR) .......................... 10-2020-0131284

(51) Int. Cl.
*H01M 10/0562*    (2010.01)
(52) U.S. Cl.
CPC .. *H01M 10/0562* (2013.01); *H01M 2300/008* (2013.01); *H01M 2300/0094* (2013.01)

(58) Field of Classification Search
CPC ....... H01M 10/0562; H01M 2300/008; H01M 2300/0094
See application file for complete search history.

(56) References Cited

U.S. PATENT DOCUMENTS 6,402,795 B1    6/2002    Chu et al.
8,404,386 B2    3/2013    Kimura
(Continued)

FOREIGN PATENT DOCUMENTS

CN    111 480 258 A    7/2020
CN    111725561 A    9/2020
(Continued)

OTHER PUBLICATIONS

Machine Translation of KR-20020085942-A (Aug. 12, 2025) (Year: 2025).*

(Continued)

*Primary Examiner* — Matthew J Merkling
(74) *Attorney, Agent, or Firm* — Lee IP Law, P.C.

(57) ABSTRACT

Provided are an all-solid secondary battery and a method of manufacturing the same, the all-solid secondary battery including: an anode layer; a cathode layer; and a solid electrolyte layer between the anode layer and the cathode layer, wherein the cathode layer contains a large-particle cathode active material, a small-diameter cathode active material, and a solid electrolyte, the solid electrolyte layer includes a first solid electrolyte layer adjacent to the cathode layer and containing a first solid electrolyte, and a second solid electrolyte layer adjacent to the anode layer and containing a second solid electrolyte, the second solid electrolyte has a larger size than the solid electrolyte of the cathode layer or the first solid electrolyte, and the second solid electrolyte has higher ion conductivity than the first solid electrolyte.

32 Claims, 15 Drawing Sheets

(56) References Cited

U.S. PATENT DOCUMENTS

| | | | |
|---|---|---|---|
| 9,634,358 B2 | 4/2017 | Matsushita | |
| 9,843,071 B2 | 12/2017 | Kato | |
| 2016/0043430 A1 | 2/2016 | Lee et al. | |
| 2016/0197351 A1 | 7/2016 | Tani et al. | |
| 2016/0218349 A1 | 7/2016 | Hasegawa et al. | |
| 2016/0248120 A1 | 8/2016 | Yamada et al. | |
| 2017/0263977 A1 | 9/2017 | Jeon et al. | |
| 2018/0114979 A1* | 4/2018 | Yoon | H01M 10/0585 |
| 2018/0226633 A1 | 8/2018 | Fukiki et al. | |
| 2018/0277907 A1 | 9/2018 | Iwasaki et al. | |
| 2018/0301753 A1* | 10/2018 | Ose | H01M 4/386 |
| 2018/0316057 A1* | 11/2018 | Sasaki | H01M 4/625 |
| 2019/0181432 A1 | 6/2019 | Yui et al. | |
| 2020/0006808 A1 | 1/2020 | Utsuno et al. | |
| 2020/0127325 A1 | 4/2020 | Takahashi et al. | |
| 2020/0335783 A1 | 10/2020 | Lee et al. | |
| 2020/0350622 A1 | 11/2020 | Sakaida et al. | |
| 2020/0381772 A1 | 12/2020 | Kim et al. | |
| 2021/0094824 A1 | 4/2021 | Lee et al. | |
| 2021/0143468 A1 | 5/2021 | Kim et al. | |
| 2021/0280869 A1 | 9/2021 | Nakano | |
| 2021/0280873 A1 | 9/2021 | Ku et al. | |
| 2021/0336269 A1 | 10/2021 | Sugimoto et al. | |
| 2021/0408529 A1* | 12/2021 | Abdul Jabbar | H01M 4/485 |
| 2022/0045366 A1* | 2/2022 | Huang | H01M 50/446 |
| 2022/0115640 A1 | 4/2022 | Sugimoto et al. | |
| 2023/0084324 A1 | 3/2023 | Ryu et al. | |
| 2023/0275260 A1* | 8/2023 | Jung | H01M 10/052 429/323 |
| 2023/0291004 A1 | 9/2023 | Lee et al. | |
| 2023/0352728 A1 | 11/2023 | Ryu et al. | |
| 2024/0136593 A1* | 4/2024 | Koyama | H01M 10/0562 |
| 2024/0204247 A1* | 6/2024 | Sugimoto | H01M 4/525 |

FOREIGN PATENT DOCUMENTS

| | | | |
|---|---|---|---|
| JP | 2004-206942 A | | 7/2004 |
| JP | 2012-243644 A | | 12/2012 |
| JP | 2015-220012 A | | 12/2015 |
| JP | 5930035 B2 | | 6/2016 |
| JP | 2018-206611 A | | 12/2018 |
| JP | 2019-036536 A | | 3/2019 |
| JP | 2019-106286 A | | 6/2019 |
| JP | 2020-167145 A | | 10/2020 |
| KR | 20020085942 A | * | 11/2002 |
| KR | 10-1624805 B1 | | 5/2016 |
| KR | 10-2017-0105283 A | | 9/2017 |
| KR | 10-1936827 B1 | | 1/2019 |
| KR | 10-1952196 B1 | | 2/2019 |
| KR | 10-2108136 B1 | | 5/2020 |
| KR | 10-2022-0039386 | | 3/2022 |
| WO | WO 2018/164224 A1 | | 9/2018 |
| WO | WO 2019/009228 A1 | | 1/2019 |
| WO | WO 2019/103463 A1 | | 5/2019 |
| WO | WO 2020/110666 A1 | | 6/2020 |

OTHER PUBLICATIONS

European Search Report dated Mar. 26, 2025.
International Search Report dated Nov. 1, 2021, of the corresponding PCT Patent Application No. PCT/KR2021/008961.
Korean Notice of Allowance dated Sep. 30, 2025.

* cited by examiner

ALL-SOLID-STATE SECONDARY BATTERY AND MANUFACTURING METHOD THEREFOR

CROSS REFERENCE TO RELATED APPLICATIONS

This is the U.S. national phase application based on PCT Application No. PCT/KR2021/008961, filed Jul. 13, 2021, which is based on Korean Patent Application No. 10-2020-0131284, filed Oct. 12, 2020, the entire contents of all of which are hereby incorporated by reference.

TECHNICAL FIELD

The present disclosure relates to all-solid secondary batteries and methods of manufacturing the same.

BACKGROUND ART

Recently, in response to industrial demands, batteries having high energy density and safety have been actively developed. For example, lithium-ion batteries are being used not only in the fields of information-related appliances and communication appliances, but also in the fields of automobiles. In the fields of automobiles, safety is especially important because it has an influence on life.

Since commercially available lithium-ion batteries use an electrolyte including a flammable organic solvent, there is a possibility of overheating and firing when a short circuit occurs. In this regard, all-solid batteries using a solid electrolyte instead of an electrolyte have been proposed.

Since all-solid batteries do not use flammable organic solvents, even when a short circuit occurs, the possibility of fire or explosion may be greatly reduced. Accordingly, safety of such all-solid secondary batteries may greatly increase as compared with that of lithium-ion batteries.

As the solid electrolyte for all-solid-state batteries, a sulfide-based solid electrolyte having excellent ion conductivity is used, and the sulfide-based solid electrolyte is interposed between a cathode layer and an anode layer and pressed to manufacture an all-solid secondary battery. However, such an all-solid secondary battery has a low reversible capacity at a high rate, or a short circuit occurs frequently during repetitive charging and discharging, and thus improvement is required.

DESCRIPTION OF EMBODIMENTS

Technical Problem

Provided are all-solid secondary batteries having improved interfacial characteristics of a cathode layer and a solid electrolyte layer.

Provided are methods of manufacturing the all-solid secondary batteries.

Solution to Problem

According to an aspect of an embodiment, an all-solid secondary battery includes: an anode layer; a cathode layer; and a solid electrolyte layer between the anode layer and the cathode layer, wherein the cathode layer contains a large-particle cathode active material, a small-diameter cathode active material, and a solid electrolyte, the solid electrolyte layer includes a first solid electrolyte layer adjacent to the cathode layer and containing a first solid electrolyte, and a second solid electrolyte layer adjacent to the anode layer and containing a second electrolyte, the second solid electrolyte has a larger size than the solid electrolyte of the cathode layer or the first solid electrolyte, and the second solid electrolyte has higher ion conductivity than the first solid electrolyte.

According to an aspect of another embodiment, a method of manufacturing an all-solid secondary battery, the method includes: preparing a first solid electrolyte layer and a second solid electrolyte layer using a composition for the first solid electrolyte layer, the composition containing a first solid electrolyte and a binder, and a composition for the second solid electrolyte layer, the composition containing a second solid electrolyte and a binder, respectively; and sequentially stacking the cathode layer, the first solid electrolyte layer, the second solid electrolyte layer, and the anode layer to manufacture the above-described all-solid secondary battery.

BRIEF DESCRIPTION OF THE DRAWINGS

The above and other aspects, features, and advantages of certain embodiments of the disclosure will be more apparent from the following description taken in conjunction with the accompanying drawings, in which.

EXPLANATION OF REFERENCE NUMERALS DESIGNATING THE MAJOR ELEMENTS OF THE DRAWINGS

Figure 1A:
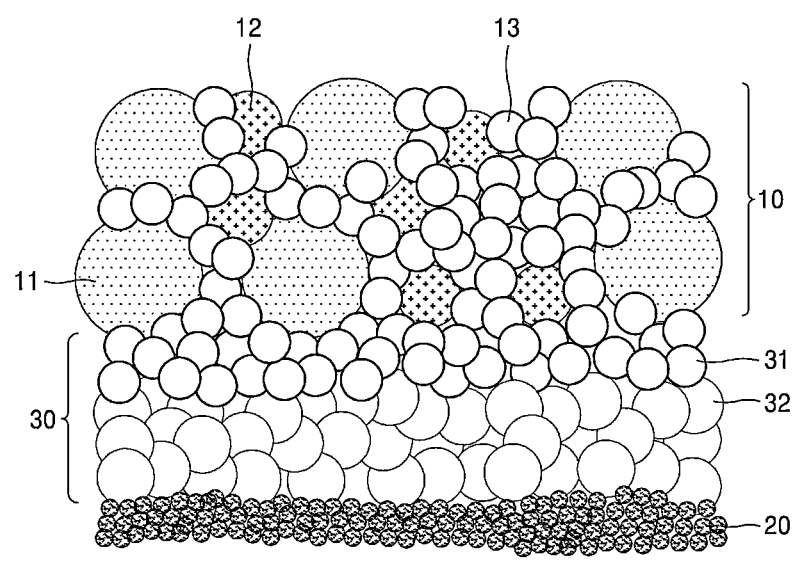
FIGS. 1A and 1B illustrate a laminated structure of a cathode layer, a solid electrolyte layer, and an anode layer in an all-solid secondary battery according to an embodiment.

| 1: Solid secondary battery | 10: Cathode layer |
|---|---|
| 11: Cathode current collector | 12: Cathode active material layer |
| 20: Anode layer | 21: Anode current collector |
| 22: Anode active material layer | 30: Solid electrolyte layer |

MODE OF DISCLOSURE

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, all-solid secondary batteries according to embodiments and methods of manufacturing an all-solid secondary battery will be described in detail.

There is provided an all-solid secondary battery including: an anode layer; a cathode layer; and a solid electrolyte layer between the anode layer and the cathode layer, wherein the cathode layer contains a large-particle cathode active material, a small-diameter cathode active material, and a solid electrolyte, the solid electrolyte layer includes i) a first solid electrolyte layer adjacent to the cathode layer and containing a first solid electrolyte, and ii) a second solid electrolyte layer adjacent to the anode layer and containing a second electrolyte, and the second solid electrolyte has a higher ion conductivity and a larger size than the first solid electrolyte.

The difference in lithium ion conductivity between the first solid electrolyte and the second solid electrolyte is 2 mS/cm or more.

Conventionally, in order to implement an all-solid secondary battery using a sulfide-based electrolyte, an active material, a sulfide-based solid electrolyte, and a conductive material were formed into a cathode, and a solid electrolyte layer was disposed between an anode and the cathode to enable the transfer of lithium ions. In order to increase the energy density of an all-solid secondary battery, it is necessary to increase the ratio of an active material in the cathode, and in order to increase the contact area with the cathode, it is essential to use a sulfide-based solid electrolyte having a small particle size.

In contrast, in the solid electrolyte layer, in order to facilitate the transfer of ions, it is necessary to use a solid electrolyte having a large particle size and excellent ion conductivity. After assembling and pressing the electrode and solid electrolyte layer configured in this way, cell performance can be improved only when interfaces are in close contact with each other.

However, when using a solid electrolyte having a small particle size in the process of manufacturing a cathode layer, the ion conductivity of the cathode layer is decreased, and thus, there is a problem in exhibiting high rate characteristics and high capacity. Further, when a solid electrolyte having large particles is used to increase the ion conductivity of the solid electrolyte layer, there is a high possibility of deteriorating cell performance as the contact area between the electrode and the solid electrolyte decreases. As a result, it is common to use a solid electrolyte having a size of about 3 µm even when the ionic conductivity is slightly lowered so as to maintain a certain contact area.

The present inventors apply a bimodal active material in the case of a cathode in order to provide an all-solid secondary battery structure capable of both high rate performance and high capacity in realizing a high-energy-density all-solid secondary battery. As described above, as a bimodal cathode is used, the particle size of a solid electrolyte in the cathode may also increase. As a solid electrolyte including a small-particle cathode active material is used, it is possible to apply a solid electrolyte having high ion conductivity, so that the performance of an all-solid secondary battery can be improved.

In order to maximize the ionic conductivity of a solid electrolyte layer, a solid electrolyte layer having very high ion conductivity and a large particle size of about 6 µm is used for the solid electrolyte layer not adjacent to the cathode layer, and for the cathode layer or the anode layer, a solid electrolyte having the same size as the solid electrolyte used in the cathode is used to increase the contact area with the electrode. Thus, it is possible to realize a battery having high energy density while maximizing the ion conductivity of both the cathode and the solid electrolyte layer.

Figure 1B:
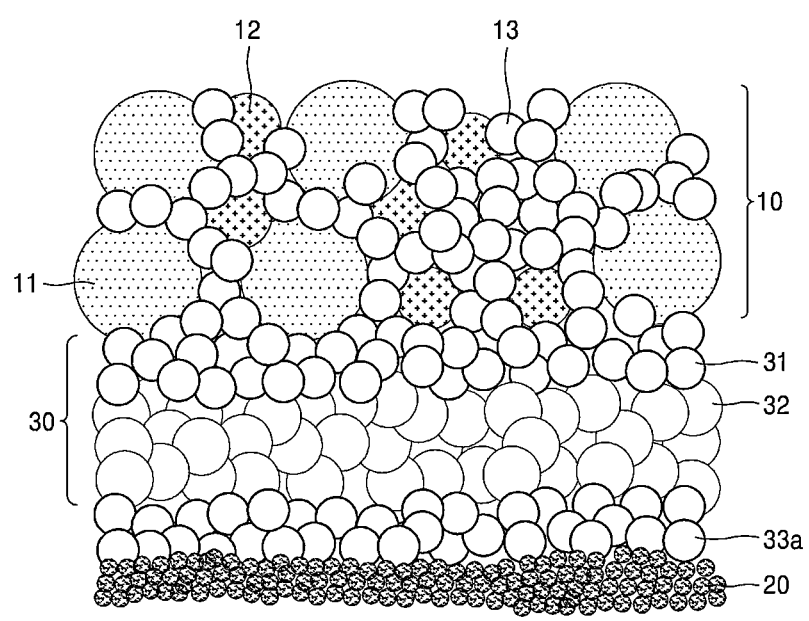

FIGS. 1A and 1B illustrate a laminated structure of a cathode layer, a solid electrolyte layer, and an anode layer in an all-solid secondary battery according to an embodiment.

Referring to FIGS. 1A and 1B, a solid electrolyte layer 30 is disposed between a cathode layer 10 and an anode layer 20. The cathode layer 10 includes a large-particle cathode active material 11, a small-particle cathode active material 12, and a solid electrolyte 13. The solid electrolyte layer 30 includes a first solid electrolyte layer 31 adjacent to the cathode layer 10 and a second solid electrolyte layer 32 adjacent to the anode layer 20. The first solid electrolyte layer 31 contains a small-particle first solid electrolyte, and the second solid electrolyte layer 32 contains a large-particle second solid electrolyte.

The size of the large-particle cathode active material 11 is 12 µm or more, 14 µm or more, for example, about 14 µm to about 20 µm. The size of the small-particle cathode active material 12 is 6 µm or less, about 2 µm to 6 µm, for example, about 3 µm to about 5.5 µm.

The size of the first solid electrolyte is about 1 µm to about 3 µm, and the size of the second solid electrolyte is about 3 µm to about 10 µm.

In this specification, the "size" refers to an average diameter when the particle is spherical, and refers to a major axis length when the particle is non-spherical.

The second solid electrolyte has a larger size and higher ion conductivity than the first solid electrolyte. The difference in ion conductivity between the first solid electrolyte and the second solid electrolyte is about 2 mS/cm to about 20 mS/cm, for example, about 2 mS/cm to about 10 mS/cm.

The solid electrolyte of the cathode layer may have the same composition as or different composition from the first solid electrolyte of the first solid electrolyte layer. Further, the first solid electrolyte and the second solid electrolyte have different compositions from each other.

According to another embodiment, the difference in ion conductivity between the first solid electrolyte layer containing the first solid electrolyte and the second solid electrolyte layer containing the second solid electrolyte is 2 mS/cm or more, for example about 2 mS/cm to about 20 mS/cm, for example about 2 mS/cm to about 10 mS/cm.

Although not shown in FIG. 1A, a solid electrolyte having a size of 1.0 μm or less, for example, about 0.5 μm to about 1.0 μm, may further exist in the interface between the cathode layer 10 and the first solid electrolyte layer 31. A solid electrolyte having a size of 1.0 μm or less may be observed in the case of using an atomized precursor when manufacturing the cathode layer. When small-sized particles exist between the interfaces, an interface area may increase to increase ion conductivity.

A third solid electrolyte layer 33 including a small-particle third solid electrolyte may be further formed between the second solid electrolyte layer 32 and the anode layer 20. When the third solid electrolyte layer 33 is formed, the interface adhesion between the third solid electrolyte layer and the anode layer 20 is excellent, and the interface resistance may be further reduced as compared with a case where the third solid electrolyte layer is not formed.

The solid electrolyte, the first solid electrolyte, or the third solid electrolyte may have form of a secondary particle, which is an aggregate of primary particles. The size of the secondary particle is about 1 μm to about 3 μm, and the size of the primary particle is 1 mm or less, for example about 0.5 μm to about 1 μm. Further, the size of the secondary particle of the second solid electrolyte is about 3 μm to about 10 μm.

The third solid electrolyte layer includes a third solid electrolyte having a size of 3 μm or less. The third solid electrolyte may be a solid electrolyte having a size of about 1 μm to about 3 μm, a solid electrolyte having a size of 1 μm or less, or a combination thereof.

If the third solid electrolyte layer is prepared using an atomized third solid electrolyte precursor, it may further include a third solid electrolyte having a size of 1 μm or less, for example, about 0.5 μm to about 1 μm.

In this specification, the solid electrolyte, the first solid electrolyte, and the third solid electrolyte may include mixed particles including primary particles and secondary particles, or mixed particles consisting of primary particles and secondary particles.

The solid electrolyte of the cathode layer, the first solid electrolyte of the first solid electrolyte layer, and the third solid electrolyte of the third solid electrolyte layer include mixed particles including primary particles and secondary particles, and the size of the solid electrolyte, the first solid electrolyte, and the third solid electrolyte is less than 3 μm or about 0.5 μm to about 1 μm. According to an embodiment, the solid electrolyte, the first solid electrolyte, and the third solid electrolyte contain secondary particles (size: less than 3 μm) and primary particles (about 0.5 μm to about 1 μm).

The second solid electrolyte of the second solid electrolyte layer includes mixed particles including, for example, primary particles and secondary particles, and the size of the second solid electrolyte is 3 μm or more and less than 10 μm, or about 0.5 μm to about 2 μm. According to another embodiment, the second solid electrolyte contain secondary particles (size: 3 μm or more and less than 10 μm) and primary particles (about 0.5 μm to about 2 μm).

The third solid electrolyte may have the same composition as or a different composition from the first solid electrolyte. Further, the third solid electrolyte has a different composition from the second solid electrolyte.

In an all-solid secondary battery according to an embodiment, a first solid electrolyte layer and a second solid electrolyte layer are disposed adjacent to the cathode layer and the anode layer, respectively, and they use solid electrolytes having different compositions and lithium ion conductivity.

The first solid electrolyte layer and the third solid electrolyte layer are disposed on the anode layer and the cathode layer, respectively, and are formed to have a smaller thickness than the second solid electrolyte layer to maximize the movement of lithium ions.

In the all-solid secondary battery, high rate charge/discharge characteristics are improved by improving the mobility of lithium ions.

The first solid electrolyte and the second solid electrolyte have an ion conductivity of 1 mS/cm or more, 1.3 mS/cm or more, 1.6 mS/cm or more, or 2.0 mS/cm or more at 25° C., 45° C. and 60° C.

Since the first solid electrolyte and the second solid electrolyte have a high ion conductivity of 1 mS/cm or more, they may be applied as electrolytes for all-solid secondary batteries.

The ion conductivity of the second solid electrolyte at 25° C., 45° C. or 60° C. is controlled to be higher than that of the solid electrolyte and the first solid electrolyte at 25° C., 45° C. or 60° C.

The ion conductivity of the second solid electrolyte at 25° C. is about 3 mS/cm to about 8 mS/cm, for example, about 5 mS/cm to about 7 mS/cm, the ion conductivity thereof at 45° C. is about 10 mS/cm to about 15 mS/cm, for example, about 12 mS/cm to about 14 mS/cm, and the ion conductivity thereof at 60° C. is about 16 mS/cm to about 20 mS/cm, for example, about 17 mS/cm to about 19 mS/cm. Further, the ion conductivity of the first solid electrolyte at 25° C. is about 1 mS/cm to about 5 mS/cm, for example, about 1 mS/cm to about 2 mS/cm, the ion conductivity thereof at 45° C. is about 3 mS/cm to about 8 mS/cm, for example, about 4 mS/cm to about 6 mS/cm, and the ion conductivity thereof at 60° C. is about 5 mS/cm to about 12 mS/cm, for example, about 7 mS/cm to about 11 mS/cm, for example, about 9 mS/cm to about 11 mS/cm.

According to an embodiment, the first solid electrolyte and the second solid electrolyte are sulfide-based solid electrolytes having an argyrodite crystal structure, and the ion conductivity of the second solid electrolyte is higher than that of the first solid electrolyte.

The ratio (a/a') of size a of the solid electrolyte of the cathode layer and size a' of the first solid electrolyte of the first solid electrolyte layer is about 0.33 to about 3.0, about 0.5 to about 2.5, or about 0.6 to about 2.0.

The solid electrolyte of the cathode layer, the first solid electrolyte, and the second solid electrolyte may be sulfide-based solid electrolytes having an argyrodite crystal structure.

The second electrolyte includes i) halogen atom selected from Br, I, and a combination thereof and ii) Cl, and in the second electrolyte, the ratio (a/a') of size a of the second solid electrolyte of the cathode layer and size a' of the second solid electrolyte of the second solid electrolyte layer is about 0.66 to about 1.5, Each of the solid electrolyte and the first solid electrolyte includes Cl, and each of the solid electrolyte and the first solid electrolyte includes a compound represented by Formula 1 below and having an argyrodite crystal structure.

$$Li_aM_xPS_b(Cl)_d \qquad \text{<Formula 1>}$$

in Formula 1, M is Na, K, Fe, Mg, Ca, Ag, Cu, Zr, Zn, or a combination thereof, X is Br, I, or a combination thereof, and $0 \leq x \leq 0.07$, a is a number from 5 to 6, b is a number from 4 to 6, $0 < d \leq 2$, and $5 \leq a+x \leq 6$.

The second solid electrolyte contains a compound having an argyrodite crystal structure and including chlorine (Cl), and the first solid electrolyte contains a compound having an argyrodite crystal structure and including i) a halogen atom selected from Br, I, and a combination thereof, and ii) chlorine (Cl).

The second solid electrolyte includes a compound represented by Formula 2 below and having an argyrodite crystal structure.

$$Li_aM_xPS_b(X1)_{c1}(Cl)_{d1} \qquad \text{<Formula 2>}$$

in Formula 2, M is Na, K, Fe, Mg, Ca, Ag, Cu, Zr, Zn, or a combination thereof, X1 is Br, I, or a combination thereof, and 0≤x≤0.07, a is a number from 5 to 6, b is a number from 4 to 6, 0<d≤2, c1>0, d1>0, 0<c1+d1<2, and 5≤a+x≤6.

The second solid electrolyte has higher ion conductivity than the first solid electrolyte, but has brittle characteristics when forming a film. The first solid electrolyte has lower lithium ion conductivity than the second solid electrolyte, but has better film formation properties and excellent mechanical properties. The first solid electrolyte may exist at the interface with the cathode layer to effectively prevent the degradation of oxidation stability.

The thickness ratio of the above-described first solid electrolyte layer and second solid electrolyte layer is about 1:1 to about 1:10, for example about 1:2 to about 1:8, for example about 1:2.5 to about 1:6, for example about 1:3 to about 1:4. Here, the thickness ratio refers to a thickness ratio after pressing.

In this specification, the first solid electrolyte layer and the second solid electrolyte layer are obtained by interposing the first solid electrolyte layer and the second solid electrolyte layer between the cathode layer and the anode layer to form a laminate and then pressing the laminate. The thicknesses of the first solid electrolyte layer and the second solid electrolyte layer refers to thicknesses after pressing. In this case, the pressing is performed by a pressure of 500 MPa or less, for example 300 MPa or less, 250 MPa or less, 200 MPa or less, 150 MPa or less, or 100 MPa or less, for example about 50 MPa to about 100 MPa.

The thickness of the second solid electrolyte layer is greater than the thickness of the first solid electrolyte layer, and the thickness of the first solid electrolyte layer is about 1 μm to about 35 μm, about 1 μm to about 30 μm, about 1 μm to about 25 μm, about 10 μm to about 25 μm, about 12 μm to about 25 μm, or about 15 μm to about 25 μm. Further, the thickness of the second solid electrolyte layer is about 10 μm to about 60 μm, about 20 μm to about 50 μm, or about 25 μm to about 45 μm.

According to an embodiment, the thickness of each of the first solid electrolyte layer and the second solid electrolyte layer after pressing may be reduced to a level of about 60% to about 80%, for example, 60 to 70%, as compared with the thickness of each of the first solid electrolyte and the second solid electrolyte before pressing.

In the all-solid secondary battery according to an embodiment, the total thickness of the solid electrolyte layers is about 11 μm to about 200 μm, for example, about 50 μm to about 150 μm.

The compound represented by Formula 2 above is a compound represented by Formula 3 below.

$$(Li_{1-x1}M_{x1})_{7-y}PS_{6-y}(Br_{1-x2}(Cl)_{x2})_y \qquad \text{<Formula 3>}$$

in Formula 3, M is Na, K, Fe, Mg, Ca, Ag, Cu, Zr, Zn, or a combination thereof, and $$0 \le x1 < 1, 0 < x2 < 1, \text{ and } 0 \le y \le 2.$$

The compound represented by Formula 2 above is a compound represented by Formula 4 below.

$$Li_aM_xPS_b(Br)c(Cl)_d \qquad \text{<Formula 4>}$$

in Formula 4, M is Na, K, Fe, Mg, Ca, Ag, Cu, Zr, Zn, or a combination thereof,

X is Br, I, or a combination thereof, and 0≤x≤0.07, a is a number from 5 to 6, b is a number from 4 to 6, 0<d≤2, c>0, d>0, 0<c+d≤2, and 5≤a+x≤6.

In Formulas 1 to 4, 0<x<0.05, and b is a number of more than 4 and less than 6, for example, 4 to 5.8 or 4 to 4.5.

The compound represented by Formula 1 is $Li_{5.75}PS_{4.75}Cl_{1.25}$, $Li_{5.75}PS_{4.5}Cl_{1.5}$, $Li_{5.5}PS_{4.5}Cl_{1.5}$, $Li_{5.45}Na_{0.05}PS_{4.5}Cl_{1.5}$, $Li_{5.45}K_{0.05}PS_{4.5}Cl_{1.5}$, $Li_{5.74}PS_{4.74}Cl_{1.26}$, $Li_5Na_{0.05}PS_4Cl_2$, $Li_5K_{0.05}PS_4Cl_2$, $Li_{5.8}PS_{4.8}Cl_{1.2}$, $Li_{5.7}Na_{0.05}PS_{4.75}Cl_{1.25}$, $Li_{5.7}Cu_{0.05}PS_{4.75}Cl_{1.25}$, Specific examples of the compound represented by Formula 2 may include $(Li_{5.72}Cu_{0.03})PS_{4.4}Cl_{1.4}Br_{0.2}$, $(Li_{5.73}Cu_{0.02})PS_{4.4}Cl_{1.4}Br_{0.2}$, $(Li_{5.74}Cu_{0.01})PS_{4.4}Cl_{1.4}Br_{0.2}$, and combinations thereof.

When the above-described first solid electrolyte layer and second solid electrolyte layer are formed between the anode layer and the cathode layer, the occurrence of cracks in the electrolyte layer after pressing for manufacturing a battery is suppressed and the deterioration of oxidation stability at the interface between the cathode and the solid electrolyte layer is prevented. As a result, the charge/discharge reversible capacity at a high rate may be increased.

An all-solid secondary battery includes a cathode layer; an anode layer; and a solid electrolyte layer between the cathode layer and the anode layer. The solid electrolyte layer includes the above-described sulfide-based solid electrolyte. Since the solid electrolyte layer includes the above-described sulfide-based solid electrolyte, side reactions with lithium metal contained in the anode layer are suppressed, so that the cycle characteristics of the all-solid secondary battery are improved.

In the all-solid secondary battery according to an embodiment, the cathode layer includes a compound represented by Formula 1 below as a solid electrolyte.

$$Li_aM_xPS_b(Cl)_d \qquad \text{<Formula 1>}$$

in Formula 1, M is Na, K, Fe, Mg, Ca, Ag, Cu, Zr, Zn, or a combination thereof,

X is Br, I, or a combination thereof, and 0≤x≤0.07, a is a number from 5 to 6, b is a number from 4 to 6, 0<d≤2, and 5≤a+x≤6.

The content of the solid electrolyte in the cathode is about 2 parts by weight to about 70 parts by weight, for example, about 3 parts by weight to about 30 parts by weight, based on 100 parts by weight of the cathode active material. When the content of the sulfide-based solid electrolyte in the cathode is within the above range, the high-voltage stability of the all-solid secondary battery is improved.

Hereinafter, the all-solid secondary battery according to an embodiment will be described in detail with reference to the accompanying drawings.

Figure 6:
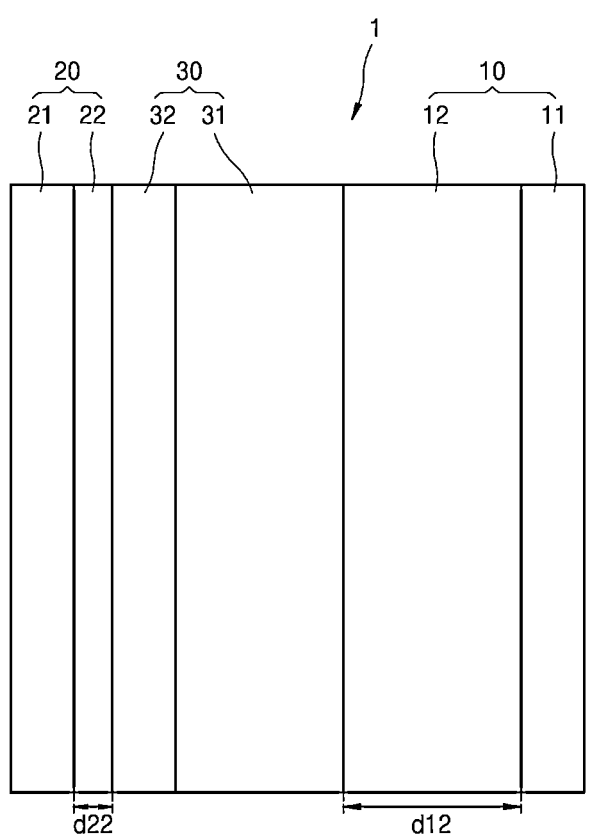
FIGS. 6 to 8 are cross-sectional views of all-solid secondary batteries according to an embodiment, respectively.
Figure 7:
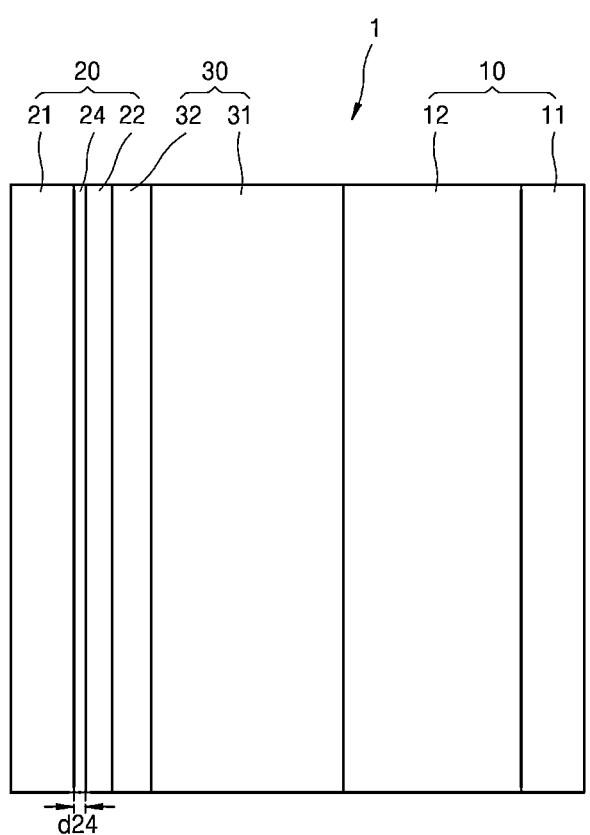
Figure 8:
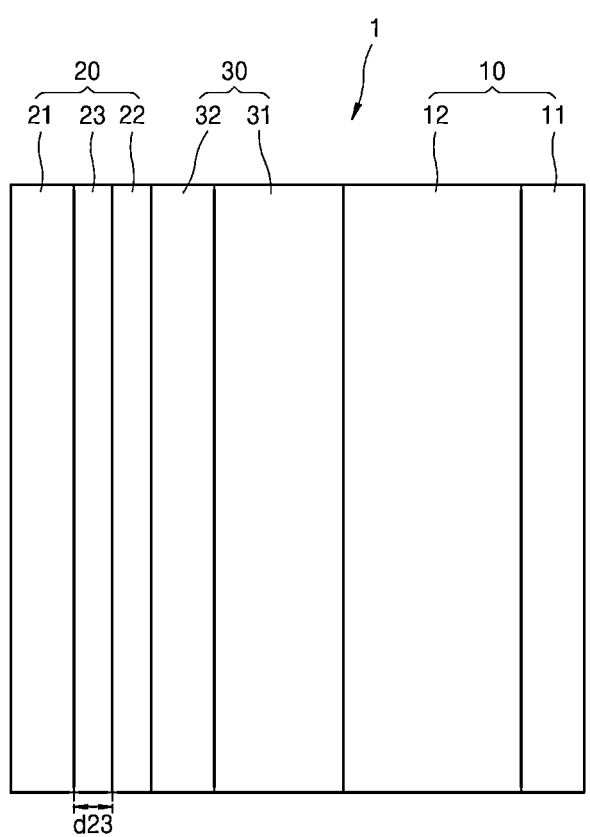

Referring to FIGS. 6 to 8, the all-solid secondary battery 1 includes an anode layer 20 including an anode current collector layer 21 and a first anode active material layer 22; a cathode layer 10 including an cathode active material layer 12; and a solid electrolyte layer 30 disposed between the anode layer 20 and the cathode layer 10, and the solid electrolyte layer 30 contains a first solid electrolyte layer 31 and a second electrolyte layer 32. The cathode layer 10 may contain a solid electrolyte. The first solid electrolyte layer 31 and second solid electrolyte layer 32 of the solid electrolyte layer 30, and the solid electrolyte of the cathode layer 10 are the first solid electrolyte layer, second solid electrolyte layer and solid electrolyte shown in FIGS. 1A and 1B, respectively.

Although not shown in FIGS. 6 to 8, a third solid electrolyte layer may be further disposed between the second solid electrolyte layer 32 and the anode layer 20.

The cathode layer 10 contains, for example, a cathode active material, a sulfide-based solid electrolyte, and a conductive agent.

(Anode Layer)

Referring to FIGS. 6 to 8, the anode layer 20 includes an anode current collector layer 21 and a first anode active material layer 22, and the first anode active material layer 22 includes an anode active material The anode active material included in the first anode active material layer 22 has, for example, a particle shape. An average particle diameter of the anode active material having a particle shape is, for example, 4 µm or less, 3 µm or less, 2 µm or less, 1 µm or less, or 900 nm or less. The average particle diameter of the anode active material having a particle shape is, for example, about 10 nm to about 4 µm, about 10 nm to about 3 µm, about 10 nm to about 2 µm, about 10 nm to about 1 µm, or about 10 nm to about 900 nm. The anode active material has an average particle diameter within the above range, and thus reversible absorbing and/or desorbing of lithium during charging and discharging may be more easily performed The average particle diameter of the anode active material is, for example, a median diameter (D50) measured by using a laser-type particle size distribution meter.

The anode active material included in the first anode active material layer 22 includes, for example, one or more selected from a carbon-based anode active material and a metal or metalloid anode active material.

The carbon-based anode active material is, for example, amorphous carbon Amorphous carbon is, for example, carbon black (CB), acetylene black (AB), furnace black (FB), ketjen black (KB), graphene or the like, but not limited thereto, and any one classified as amorphous carbon in the art may be used. Amorphous carbon is carbon having no crystallinity or very low crystallinity, and is distinguished from crystalline carbon or graphite-based carbon.

The metal or metalloid anode active material includes one or more selected from the group consisting of gold (Au), platinum (Pt), palladium (Pd), silicon (Si), silver (Ag), aluminum (Al), bismuth (Bi), tin (Sn) and zinc (Zn), but is not necessarily limited thereto, and any one available as a metal anode active material or a metalloid anode active material forming an alloy or a compound with lithium in the art may be used. For example, nickel (Ni) is not a metal anode active material because nickel (Ni) does not form an alloy with lithium.

The first anode active material layer 22 includes one kind of the anode active materials, or a mixture of a plurality of different anode active materials. For example, the first anode active material layer 22 includes only amorphous carbon or one or more selected from the group consisting of gold (Au), platinum (Pt), palladium (Pd), silicon (Si), silver (Ag), aluminum (Al), bismuth (Bi), tin (Sn), and zinc (Zn). Alternatively, the first anode active material layer 22 includes a mixture of amorphous carbon and one or more selected from the group consisting of gold (Au), platinum (Pt), palladium (Pd), silicon (Si), silver (Ag), aluminum (Al), bismuth (Bi) tin (Sn), and zinc (Zn). A mixing ratio of the mixture of amorphous carbon and gold (Au), as a weight ratio, is, for example, 10:1 to 1:2, 5:1 to 1:1, or 4:1 to 2:1, but is not necessarily limited to the range, and is selected according to required characteristics of the solid secondary battery 1. As the anode active layer has the above composition, cycle characteristics of the all-solid secondary battery 1 are enhanced even more.

The anode active material included in the first negative electrode active material layer 22 includes, for example, a mixture of first particles formed of amorphous carbon and second particles formed of metal or metalloid. The metal or metalloid includes, for example, gold (Au), platinum (Pt), palladium (Pd), silicon (Si), silver (Ag), aluminum (Al), bismuth (Bi), tin (Sn), or zinc (Zn). The metalloid is alternatively a semiconductor. An amount of the second particles is about 8 w % to about 60 w %, about 10 wt % to about 50 w %, about 15 wt % to about 40 wt %, or about 20 wt % to about 30 wt %. As the second particles have the amount in the range above, cycle characteristics of the all-solid secondary battery 1 are further enhanced.

The first anode active material layer 22 includes, for example, a binder. The binder is, for example, styrene-butadiene rubber (SBR), polytetrafluoroethylene (PTFE), polyvinylidene fluoride (PVDF), polyethylene, a vinylidene fluoride/hexafluoropropylene copolymer, polyacrylonitrile, polymethyl methacrylate, or the like, but are not necessarily limited thereto, and any one available as a binder in the art may be used. The binder may be composed of a single or a plurality of different binders.

The first anode active material layer 22 includes the binder and thus is stabilized on the anode current collector 21. In addition, cracking of the first negative electrode active material layer 22 is prevented despite a volume change and/or a relative position change of the first anode active material layer 22 in charge/discharge processes. For example, when the first anode active material layer 22 does not include the binder, the first anode active material layer 22 may be easily separated from the anode current collector 21. A portion where the first anode active material layer 22 is separated from the anode current collector 21 is exposed to the anode current collector 21 and contacts the solid electrolyte layer 30, thereby increasing the possibility of short circuit occurrence. The first anode active material layer 22 is prepared, for example, by applying a slurry in which materials forming the first anode active material layer 22 are dispersed on the anode current collector 21 and drying the same. The anode active material may be stably dispersed in the slurry by including the binder in the first anode active material layer 22. For example, when the slurry is applied on the anode current collector 21 by a screen printing method, clogging of a screen (for example, clogging by agglomerates of the anode active material) may be prevented.

A thickness d22 of the first anode active material layer is, for example, 50% or less, 40% or less, 30% or less, 20% or less, 10% or less, or 5% or less of a thickness d12 of the cathode active material layer. The thickness d22 of the first anode active material layer is, for example, about 1 µm to about 20 µm, about 2 µm to about 10 µm, or about 3 µm to about 7 µm. When the thickness d22 of the first anode active material layer excessively decreases, lithium dendrites formed between the first anode active material layer 22 and the anode current collector 21 collapses the first anode active material layer 22, thereby making it difficult to improve the cycle characteristics of the all-solid secondary battery 1. When the thickness d22 of the anode active material layer excessively increases, the energy density of the all-solid secondary battery 1 decreases, and the internal resistance of the all-solid secondary battery 1 by the first anode active material layer 22 increases, thereby making it difficult to improve the cycle characteristics of the secondary battery 1.

When the thickness d22 of the first anode active material layer decreases, for example, a charge capacity of the first anode active material layer 22 also decreases. The charge capacity of the first anode active material layer 22 is, for example, 50% or less, 40% or less, 30% or less, 20% or less, 10% or less, 5% or less, or 2% or less compared to the charge capacity of the cathode active material layer 12. The charge capacity of the first anode active material layer 22 is, for example, about 0.1% to about 50%, about 0.1% to about 40%, about 0.1% to about 30%, about 0.1% to about 20%, about 0.1% to about 10%, about 0.1% to about 5%, or about 0.1% to about 2% compared to the charge capacity of the cathode active material layer 12. When the charge capacity of the first anode active material layer 22 is too small, the thickness of the first anode active material layer 22 becomes very thin, so that lithium dendrites formed between the first anode active material layer 22 and the anode current collector 21 during repeated charge and discharge processes collapses the first anode active material layer 22, thereby making it difficult to improve the cycle characteristics of the all-solid secondary battery 1. When the charge capacity of the first anode active material layer 22 excessively increases, the energy density of the all-solid secondary battery 1 decreases, and the internal resistance of the all-solid secondary battery 1 by the first anode active material layer 22 increases, thereby making it difficult to improve the cycle characteristics of the secondary battery 1.

A charge capacity of the cathode active material layer 12 is obtained by multiplying a charge capacity density (mAh/g) of the cathode active material by a mass of the cathode active material layer 12. When various types of cathode active materials are used, a value of multiplying a charge capacity density by a mass is calculated for each cathode material, and the sum of these values is the charge capacity of the cathode active material layer 12. A charging capacity of the first anode active material layer 22 is also calculated in the same manner. That is, the charge capacity of the first anode active material layer 22 is obtained by multiplying a charge capacity density (mAh/g) of the anode active material by a mass of the anode active material in the first anode active material layer 22. When various types of anode active materials are used, a value of multiplying a charge capacity density by a mass is calculated for each anode material, and the sum of these values is the charge capacity of the anode active material layer 22. Here, the charge capacity densities of the cathode active material and the anode active material are capacities estimated by using an all-solid half-cell using lithium metal as a counter electrode. The charge capacities of the cathode active material layer 12 and the first anode active material layer 22 are directly measured by measuring a charge capacity using the all-solid half-cell. The charge capacity density is obtained by dividing the measured charge capacity by the mass of each active material. Alternatively, the charge capacities of the cathode active material layer 12 and the first anode active material layer 22 may be initial charge capacities measured at the first charge cycle.

The anode current collector 21 is formed of, for example, a material which does not react with lithium, that is, does not form both an alloy and a compound. Materials forming the anode current collector 21 are, for example, a metal such as copper (Cu), stainless steel, titanium (Ti), iron (Fe), cobalt (Co), or nickel (Ni), but are not limited thereto, and any one available as an electrode current collector in the art may be used. The anode current collector 21 may be formed of one of the metal, or may be formed of an alloy of two or more types of metal or a coating material. The anode current collector 21, for example, is in the form of a plate or foil.

The first anode active material layer 22 may further include additives, used for a conventional all-solid secondary battery 1, for example, a filler, a dispersant, and an ion conductive agent.

Referring to FIG. 8, the all-solid secondary battery 1 further includes, for example, a thin film 24 including an element capable of forming an alloy with lithium on the anode current collector 21. The thin film 24 is disposed between the anode current collector 21 and the first anode active material layer 22. The thin film 24 includes, for example, an element capable of forming an alloy with lithium. Elements capable of forming an alloy with lithium are, for example, gold, silver, zinc, tin, indium, silicon, aluminum, bismuth, and the like, but are not necessarily limited thereto, and any element capable of forming an alloy with lithium in the art may be used. The thin film 24 is formed of one of these metals, or an alloy of various types of metals. The thin film 24 is disposed on the anode current collector 21, for example, and thus a precipitation form of the second anode active material layer (not shown), precipitated between the thin film 24 and the first anode active material layer 22, is further flattened, thereby enhancing cycle characteristics of the all-solid secondary battery 1.

A thickness d24 of the thin film is, for example, 1 nm to 800 nm, 10 nm to 700 nm, 50 nm to 600 nm, or 100 nm to 500 nm. When the thickness d24 of the thin film is within the above range, the function by the thin film 24 can be exhibited well. When the thickness of the thin film is within the above range, the phenomenon that the energy density of the all-solid-state battery is lowered by reducing the amount of lithium deposited at the anode by absorbing lithium by the thin film 24 itself can be suppressed. The thin film 24 may be disposed on the anode current collector 21 by, for example, a vacuum deposition method, a sputtering method, a plating method, or the like, but is not necessarily limited thereto, and any method capable of forming the thin film 24 in the art may be used.

Referring to FIG. 7, the all-solid secondary battery 1 further includes, for example, a second anode active material layer 23 disposed between the anode current collector 21 and the solid electrolyte layer 30 by charging. The all-solid secondary battery 1 further includes the second anode active material layer 23 disposed between the anode current collector 21 and the first anode active material layer 22 by charging. Although not shown in the drawing, the all-solid secondary battery 1 further includes, for example, a second anode active material layer 23 disposed between the solid electrolyte layer 30 and the first anode active material layer 22 by charging.

The second anode active material layer 23 is a metal layer including lithium or a lithium alloy. The metal layer includes lithium or a lithium alloy. Accordingly, the second anode active material layer 23 is a metal layer including lithium and thus acts as, for example, a lithium reservoir. Lithium alloys are, for example, an Li—Al alloy, an Li—Sn alloy, an Li—In alloy, an Li—Ag alloy, an Li—Au alloy, an Li—Zn alloy, an Li—Ge alloy, an Li—Si alloy, and the like, but are not limited thereto, and any one available as a lithium alloy in the art may be used. The second anode active material layer 23 may be formed of one of these alloys or lithium, or formed of various types of alloys.

The thickness (d23) of the second anode active material layer is not particularly limited, but is, for example, 1 μm to 1000 μm, 1 μm to 500 μm, 1 μm to 200 μm, 1 μm to 150 μm, 1 μm to 100 μm, or 1 μm to 50 μm. When the thickness (d23)

of the second anode active material layer is within the above range, the second negative electrode active material layer 23 may serve as a lithium reservoir. If the thickness (d23) of the second anode active material layer is within the above range, the phenomenon that the mass and volume of the all-solid-state secondary battery 1 increases and the cycle characteristics deteriorate can be suppressed. The second anode active material layer 23 may be, for example, a metal foil having a thickness within this range.

In the all-solid secondary battery 1, the second anode active material layer 23, for example, is disposed between the anode current collector 21 and the first anode active material layer 22 before assembling the all-solid secondary battery 1, or is precipitated between the anode current collector 21 and the first anode active material layer 22 by charging after assembling the all-solid secondary battery.

When the second anode active material layer 23 is disposed between the anode current collector 21 and the first anode active material layer 22 before assembling the all-solid secondary battery 1, the second anode active material layer 23 acts as a lithium reservoir since the second anode active material layer 23 is a metal layer including lithium. Cycle characteristics of the all-solid secondary battery 1 including the second anode active material layer 23 are further enhanced. For example, a lithium foil is disposed between the anode current collector 21 and the first anode active material layer 22 before assembling the all-solid secondary battery 1.

When the second anode active material layer 23 is disposed by charging after assembling the all-solid secondary battery 1, the energy density of the all-solid secondary battery 1 increases since the second anode active material layer (23) is not included when the all-solid secondary battery (1) is assembled. For example, when the all-solid secondary battery 1 is charged, charging is performed in excess of the charge capacity of the first anode active material layer 22. That is, the first anode active material layer 22 is overcharged. At an initial stage of charging, lithium is absorbed in the first anode active material layer 22. That is, the anode active material included in the first anode active material layer 22 forms an alloy or a compound with lithium ions having moved from the cathode layer 10. When charging exceeds the capacity of the first anode active material layer 22, for example, lithium is precipitated on a back surface of the first anode active material layer 22, that is, between the anode current collector 21 and the first anode active material layer 22, and a metal layer corresponding to the second anode active material layer 23 is formed by the precipitated lithium. The second anode active material layer 23 is a metal layer mainly formed of lithium (i.e., metallic lithium). Such a result is obtained since, for example, the anode active material included in the first anode active material layer 22 is formed of a material forming an alloy or a compound with lithium. During discharge, lithium of the first anode active material layer 22 and the second anode active material layer 23, that is, metal layers, is ionized and moves in the direction of the cathode layer 10. Therefore, lithium may be used as an anode active material in the all-solid secondary battery 1. In addition, the first anode active material layer 22 covers the second anode active material layer 23 and thus serves as a protective layer for the second anode active material layer 23, that is, a metal layer, and serves to suppress the growth of precipitation of lithium dendrite at the same time. Therefore, a short circuit and capacity reduction of the all-solid secondary battery 1 are suppressed, and, as a result, cycle characteristics of the all-solid secondary battery 1 are enhanced. In addition, when the second anode active material layer 23 is disposed by charging after assembling the all-solid secondary battery 1, the anode current collector 21 and the first anode active material layer 22 and a region between the same, for example, are Li-free regions which do not contain a lithium (Li) metal or a lithium (Li) alloy in an initial state or a post-discharge state of the all-solid secondary battery.

Referring to FIG. 8, the all-solid secondary battery 1 has a structure in which the second anode active material layer 23 is disposed on the anode current collector 21, and the solid electrolyte layer 30 is directly disposed on the second anode active material layer 23. The second anode active material layer 23 is, for example, a lithium metal layer or a lithium alloy layer.

Since the solid electrolyte layer 30 includes the sulfide-based solid electrolyte, a side reaction of the second anode active material layer 23, as a lithium metal layer, to the solid electrolyte layer 30 is suppressed, so that cycle characteristics of the all-solid secondary battery 1 are enhanced.

(Solid Electrolyte Layer)

Referring to FIGS. 6 to 8, the solid electrolyte layer 30 contains the first solid electrolyte layer 31 and the second solid electrolyte layer 32.

Beside the first solid electrolyte layer and the second solid electrolyte layer, a typical sulfide-based solid electrolyte may be further included. The solid electrolyte layer further includes, for example, one or more selected from $P_2S_5$, $Li_2S$—$P_2S_5$—$LiX$ (where X is a halogen element), $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (where m and n are each a positive number, and Z is one selected from Ge, Zn and Ga), $Li_2S$—$GeS_2$, $Li_2S$—$SiS_2$—$Li_3PO_4$, and $Li_2S$—$SiS_2$—$Li_pMO_q$ (where p and q are each a positive number, and M is one selected from P, Si, Ge, B, Al, Ga, and In). The sulfide-based solid electrolyte further included in the solid electrolyte layer is amorphous, crystalline, or a mixture thereof.

The typical sulfide-based solid electrolyte further includes, for example, an argyrodite-type solid electrolyte represented by Formula 6 below:

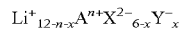

$$Li^+_{12-n-x}A^{n+}X^{2-}_{6-x}Y^-_x \qquad \text{<Formula 6>}$$

In Formula 6, A is P, As, Ge, Ga, Sb, Si, Sn, Al, In, Ti, V, Nb or Ta, X is S, Se or Te, Y is Cl, Br, I, F, CN, OCN, SCN, or N3, and 0<x<2.

The argyrodite-type solid electrolyte, for example, includes one or more selected from $Li_{7-x}PS_{6-x}Cl_x$ (where 0<x<2), $Li_{7-x}PS_{6-x}Br_x$ (where 0<x<2), and $Li_{7-x}PS_{6-x}I_x$ (where 0<x<2). The argyrodite-type solid electrolyte particularly includes one or more selected from $Li_6PS_5Cl$, $Li_6PS_5Br$, and $Li_6PS_5I$.

The solid electrolyte layer 30 containing the first solid electrolyte layer 31 and the second solid electrolyte layer 32 further includes, for example, a binder. The binder included in the solid electrolyte layer 30, for example, may be one or more selected from a styrene-butadiene-styrene copolymer, acrylic resin, styrene-butadiene rubber (SBR), polytetrafluoroethylene, polyvinylidene fluoride, polyethylene, a vinylidene fluoride/hexafluoropropylene copolymer, polyacrylonitrile, and polymethyl methacrylate, but is not limited thereto, and any one available as a binder in the art may be used. The binder of the solid electrolyte layer 30 may be the same type as or different from the binder of the cathode active material layer 12 and the anode active material layer 22.

According to one embodiment, the first solid electrolyte layer 31 and the second solid electrolyte layer 32 may use a styrene-butadiene-styrene copolymer, acrylic resin, or a combination thereof as a binder. According to another embodiment, the first solid electrolyte layer 31 may contain a styrene-butadiene-styrene (SBS) copolymer as a binder, and the second solid electrolyte layer 32 may contain acrylic resin as a binder.

According to another embodiment, the first solid electrolyte layer 31 may contain an acrylic resin as a binder, and the second solid electrolyte layer 32 may contain an acrylic resin as a binder. According to another embodiment, the first solid electrolyte layer 31 may contain a styrene-butadiene-styrene copolymer (SBS) as a binder, and the second solid electrolyte layer 32 may contain SBS as a binder.

An amount of the binder in the first solid electrolyte layer and the second solid electrolyte layer is 0.5 parts to 2.0 parts by weight or less based on 100 parts by weight of the total weight of the first solid electrolyte or the second solid electrolyte, and the binder.

When SBS is used as the binder, dispersion of the second solid electrolyte in the second solid electrolyte layer may be more smoothly performed. As a result, when coating of a composition for forming a first solid electrolyte layer for forming the first solid electrolyte layer on the anode layer is performed, the coating may be uniformly performed, and, as a result, resistance between the anode layer and the solid electrolyte layer is reduced, and thus the all-solid secondary battery having an improved capacity retention rate may be prepared.

A dispersant may be further added to the composition for forming a first solid electrolyte layer. As the dispersant, Croda's KD14, KD9, and KD13, and BYK's DISPERBYK and the like may be used, and such a dispersant is one of nonionic polymeric dispersants. The BYK company DISPERBYK includes, for example, DISPERBYK-180 and DISPERBYK-192.

The first solid electrolyte layer may include the same binder and dispersant as the first solid electrolyte layer.

(Cathode Layer)

The cathode layer 10 includes the cathode current collector 11 and the cathode active material layer 12.

The cathode current collector 11 is, for example, indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or a plate or foil formed of an alloy thereof. The cathode current collector 11 may be omitted.

The cathode active material layer 12 includes, for example, a cathode active material and a solid electrolyte. The solid electrolyte included in the anode layer 10 is similar to or different from the solid electrolyte included in the solid electrolyte layer 30. For details of the solid electrolyte, refer to the solid electrolyte layer 30. According to one embodiment, the solid electrolyte contains the sulfide-based solid electrolyte according to one embodiment.

The cathode layer contains the cathode active material, and the anode active material is a compound capable of reversibly absorbing and desorbing lithium ions and is one or more selected from, for example, a lithium transition metal oxide having a layered crystal structure, a lithium transition metal oxide having an olivine crystal structure, and a lithium transition metal oxide having a spinel crystal structure. The cathode active material is, for example, a lithium transition metal oxide such as a lithium cobalt oxide (LCO), a lithium nickel oxide, a lithium nickel cobalt oxide, a lithium nickel cobalt aluminum oxide (NCA), a lithium nickel cobalt manganese oxide (NCM), lithium manganate, lithium and iron phosphate, and a nickel sulfide, a copper sulfide, a lithium sulfide, an iron oxide, or a vanadium oxide, and the like, but is not limited thereto, and any one available as a cathode active material in the art may be used. The cathode active material may be formed of one of these examples alone or as a mixture of at least two selected from the examples of the cathode active material.

The lithium transition metal oxide is a compound represented by one of, for example, $Li_aA_{1-b}B_bD_2$ (where $0.90 \leq a \leq 1$, and $0 \leq b \leq 0.5$); $Li_aE_{1-b}B_bO_{2-c}D_c$ (where $0.90 \leq a \leq 1$, $0 \leq b \leq 0.5$, and $0 \leq c \leq 0.05$); $LiE_{2-b}B_bO_{4-c}D_c$ (where $0 \leq b \leq 0.5$, and $0 \leq c \leq 0.05$); $Li_aNi_{1-b-c}Co_bB_cD_\alpha$ (where $0.90 \leq a \leq 1$, $0 \leq b \leq 0.5$, $0 < c \leq 0.05$, and $0 \leq \alpha \leq 2$); $Li_aNi_{1-b-c}Co_bB_cO_{2-\alpha}F_\alpha$ (where $0.90 \leq a \leq 1$, $0 \leq b \leq 0.5$, $0 \leq c \leq 0.05$, and $0 \leq \alpha \leq 2$); $Li_aNi_{1-b-c}Co_bB_cO_{2-\alpha}F_2$ (where $0.90 \leq a \leq 1$, $0 \leq b \leq 0.5$, $0 \leq c \leq 0.05$, and $0 \leq \alpha \leq 2$); $Li_aNi_{1-b-c}Mn_bB_cD_\alpha$ (where $0.90 \leq a \leq 1$, $0 \leq b \leq 0.5$, $0 \leq c \leq 0.05$, and $0 \leq \alpha \leq 2$); $Li_aNi_{1-b-c}Mn_bB_cO_{2-\alpha}F_\alpha$ (where $0.90 \leq a \leq 1$, $0 \leq b \leq 0.5$, $0 \leq c \leq 0.05$, and $0 \leq \alpha \leq 2$); $Li_aNi_{1-b-c}Mn_bB_cO_{2-\alpha}F_2$ (where $0.90 \leq a \leq 1$, $0 \leq b \leq 0.5$, $0 \leq c \leq 0.05$, and $0 \leq \alpha \leq 2$); $Li_aNi_bE_cG_dO_2$ (where $0.90 \leq a \leq 1$, $0 \leq b \leq 0.9$, $0 \leq c \leq 0.5$, and $0.001 < d \leq 0$); $Li_aNi_bCo_cMn_dGeO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$, and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2G_bO_4$ (where, $0.90 \leq a \leq 1$ and $0.001 \leq b \leq 0.1$); $Li_aNi_bCo_cMn_dGeO_2$ (where, $0.90 \leq a \leq 1$, $0 \leq b \leq 0.9$, $0 \leq c \leq 0.5$, $0 < d \leq 0.5$, and $0.001 \leq 0.1$); $Li_aNiG_bO_2$ (where, $0.90 \leq a \leq 1$ and $0.001 \leq b \leq 0.1$); $Li_aCoG_bO_2$ (where, $0.90 \leq a \leq 1$ and $0.001 \leq b \leq 0.1$); $Li_aMnG_bO_2$ (where, $0.90 \leq a \leq 1$ and $0.001 \leq b \leq 0.1$); $Li_aMn_2G_bO_4$ (where, $0.90 \leq a \leq 1$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$. In the compound, A is Ni, Co, Mn, or a combination thereof; B is Al, Ni, Co, Mn, Cr, Fe, Mg, Sr, V, a rare earth element, or a combinations thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof. A compound having a coating layer added on a surface thereof may be also used, and a mixture having the compound described above and a coating layer which are added thereto may be also used. The coating layer added to the surface of the compound includes, for example, a coating element compound of an oxide, a hydroxide, an oxyhydroxide, an oxycarbonate, or a hydroxycarbonate of the coating element. The compound forming the coating layer is amorphous or crystalline. The coating elements included in the coating layer are Mg, Al, Co, K, Na, Ca, Si, Ti, V, Sn, Ge, Ga, B, As, Zr, or a mixture thereof. A method of forming the coating layer is selected within a range which does not adversely affect properties of the cathode active material. The coating method is, for example, spraying, coating, or dipping. Since a specific coating method can be well understood by people in the art, detailed descriptions thereof will be omitted.

The cathode active material includes, for example, a lithium salt of a transition metal oxide having a layered rock salt type structure among the lithium transition metal oxides described above. The "layered rock salt type structure", for example, is a structure wherein an oxygen atom layer and a metal atom layer are alternately and regularly arranged in the direction of <111> of a cubic rock salt type structure, whereby each atom layer forms a two-dimensional plane. "Cubic rock salt type structure" refers to a sodium chloride type (NaCl type) structure, which is a type of crystal structure, and, specifically, has a structure in which face-centered cubic lattices (FCCs) forming each of cations and anions are arranged to be displaced from each other by ½ of a ridge of a unit lattice. A lithium transition metal oxide having the layered rock salt type structure is a ternary lithium transition metal oxide, for example, $LiNi_xCo_yAl_zO_2$ (NCA) or $LiNi_xCo_yMn_zO_2$ (NCM) ($0<x<1$, $0<y<1$, $0<z<1$, $x+y+z=1$). When the cathode active material includes a ternary lithium transition metal oxide having a layered rock salt structure, the energy density and thermal stability of the all-solid secondary battery 1 are further improved.

The cathode active material may be covered by the coating layer as described above. The coating layer may be any one known as a coating layer of the cathode active material of the all-solid secondary battery. The coating layer is, for example, $Li_2O$—$ZrO_2$ or the like.

When the cathode active material includes nickel (Ni) as a ternary lithium transition metal oxide such as NCA or NCM, the capacity density of the all-solid secondary battery 1 is increased, whereby metal elution of the cathode active material in a charged state may be reduced. As a result, cycle characteristics in the charge state of the all-solid state secondary battery 1 are enhanced.

The shape of the cathode active material is, for example, a sphere or an elliptical sphere. A particle size of the cathode active material is not particularly limited and is within a range applicable to a conventional all-solid secondary battery. An amount of the cathode active material in the cathode layer 10 is also not particularly limited and is within a range applicable to a conventional all-solid secondary battery.

The cathode layer 10 may further include additives, for example, a conductive agent, a binder, a filler, a dispersant, and an ion conductive auxiliary agent, in addition to the cathode active material and the solid electrolyte described above. The conductive agents are, for example, graphite, carbon black, acetylene black, Ketjen black, carbon fiber, metal powder, and the like. The binder is, for example, styrene butadiene rubber (SBR), polytetrafluoroethylene, polyvinylidene fluoride, polyethylene, and the like. As a coating agent, a dispersant, an ion conductive auxiliary agent, and the like which may be mixed with the anode layer 10, known materials commonly used for an electrode of a solid secondary battery are used.

A method of preparing a sulfide-based solid electrolyte according to another embodiment comprises providing a mixture including a raw material composition including a P element, an S element, and an Li element, and a lithium compound, containing a halogen element; and preparing a sulfide-based solid electrolyte by reacting the mixture.

The mixture includes a raw material composition containing a P element, an S element, and an Li element, and a lithium compound containing a halogen element. The raw material composition containing the P element, the S element, and the Li element includes, for example, $Li_2S$ and $P_2S_5$. The lithium compound containing a halogen element is, for example, lithium halide. Lithium halide is, for example, LiCl, LiI, or LiBr.

The mixture is used as a sulfide-based solid electrolyte precursor mixture, and the mixture may be milled to further undergo a process of atomizing the mixture to an average particle diameter of about 1 μm to about 2.8 μm or about 1.5 μm to about 2.5 μm. The average particle diameters of the atomized precursors may be somewhat different from each other for each precursor. For example, when lithium sulfide or phosphorus sulfide is atomized, the average particle diameter of the atomized precursor may be about 1.4 um to about 1.6 μm, and the average particle diameter of the atomized lithium chloride may be about 2.3 μm to about 2.6 μm. When the mixture atomized in this way is used, a cathode layer having high energy density and excellent ion conductivity may be prepared by using the finally obtained sulfide-based solid electrolyte. Further, when the first solid electrolyte layer, the second solid electrolyte layer, and the third solid electrolyte layer are formed by using the atomized mixture, interfacial resistance may be reduced, and thus lithium ion conductivity may be improved.

In the operation of preparing the sulfide-based solid electrolyte by reacting the mixture, for example, a solid electrolyte precursor is obtained by reacting the mixture and the solid electrolyte precursor is treated with heat at about 350° C. to about 550° C. to prepare the sulfide-based solid electrolyte.

A method for reacting the mixture is not particularly limited, but is, for example, a mechanical milling (MM) method. For example, when the MM method is used, the sulfide-based solid electrolyte precursor is prepared by reacting starting materials such as $Li_2S$ and $P_2S_5$ by stirring the same using a ball mill or the like. A stirring speed and a stirring time of the MM method are not particularly limited, but the faster the stirring speed, the faster the formation speed of the sulfide-based solid electrolyte precursor, and the longer the stirring time, the higher the conversion rate from the raw materials to the sulfide-based solid electrolyte precursor.

Subsequently, the solid electrolyte precursor obtained by the MM method or the like is heat-treated at a predetermined temperature, and then pulverized to prepare a particulate solid electrolyte. When the solid electrolyte has glass transition properties, change of the solid electrolyte from an amorphous form to a crystalline form by heat treatment is possible. The heat treatment temperature is, for example, about 350° C. to about 550° C. Due to the heat treatment temperature, the sulfide-based solid electrolyte with a uniform composition is easily obtained.

A heat treatment time depends on the heat treatment temperature, for example, about 1 hour to about 100 hours, about 10 hours to about 80 hours, about 20 hours to about 28 hours, or 24 hours. A good ionic conductivity and high-temperature stability are obtained at the same time by the sulfide-based solid electrolyte obtained by the heat treatment time in the range.

A heat treatment atmosphere is an inert atmosphere.

The heat treatment atmosphere is nitrogen, argon, and the like, but is not necessarily limited thereto, and any one available as an inert atmosphere in the art may be used.

The heat treatment includes first heat treatment and second heat treatment. The first heat treatment may be performed at about 300° C. to about 550° C., for example, at about 300° C., and second heat treatment may be performed at about 450° C. to about 550° C., for example, at 500° C.

In the method of manufacturing an all-solid secondary battery, the all-solid secondary battery is manufactured by stacking a first electrolyte layer 31 and a second solid electrolyte 32 on a cathode layer 10 and stacking an anode layer 20 thereon. A third electrolyte layer may be further formed between the second electrolyte layer 32 and the anode layer 20.

According to an embodiment, the first solid electrolyte layer 31, the second solid electrolyte layer 32, and the third solid electrolyte layer may be laminated at the same time. According to another embodiment, the first solid electrolyte layer 31 and the second solid electrolyte layer 32 may be prepared in the form of a sheet by applying and drying a composition for forming a first solid electrolyte layer and a composition for forming a second solid electrolyte layer on substrates and separating them from the substrates. As a non-limiting example, a polyethylene terephthalate film or a polyethylene nonwoven fabric may be used as the substrate.

According to still another embodiment, the first solid electrolyte layer 31 may be formed by applying and drying, or transferring a composition for forming a first solid electrolyte layer on the cathode layer 10. As the second solid electrolyte layer 32, the solid electrolyte layer in the form of a sheet obtained according to the above-described method may be used.

Subsequently, the cathode layer, the solid electrolyte layer, and the anode layer are packaged with a packaging material and then pressed to manufacture an all-solid secondary battery. The pressing may be carried out using roll pressing, hot pressing, warm isotactic pressing, or the like. The isotactic pressing is specifically carried out at a temperature of about 85° C. and a pressure of about 490 MPa for about 30 minutes.

During the pressing, mass production is possible when the roll pressing or the hot pressing is used, and a close interface may be formed in a process of compressing the electrode layers and the solid electrolyte layer Preparation of Anode Layer Materials forming a first anode active material layer 22, such as an anode active material, a conducive agent, a binder, and a solid electrolyte are added to a polar solvent or a non-polar solvent to prepare a slurry. The slurry is coated and dried on an anode current collector 21 to prepare a first laminate. Subsequently, the dried first stack is pressed to prepare an anode layer 20. The pressing is, for example, the roll pressing, the flat press, or the like, but is not necessarily limited thereto, and any pressing method available in the art may be used. The pressing operation may be omitted.

The anode layer includes a first anode active material layer including an anode current collector and an anode active material disposed on the anode current collector, wherein the anode active material includes at least one selected from a carbonaceous anode active material and a metal or metalloid anode active material, wherein the carbonaceous anode active material includes at least one selected from amorphous carbon and crystalline carbon. In addition, the metal or metalloid anode active material is one or more selected from the group consisting of gold (Au), platinum (Pt), palladium (Pd), silicon (Si), silver (Ag), aluminum (Al), bismuth (Bi), tin (Sn), and zinc (Zn).

The anode layer may further include a second anode active material layer at least one selected from between the anode current collector and the first anode active material layer and between the solid electrolyte layer and the first anode active material layer, wherein the second anode active material layer is a metal layer including lithium or a lithium alloy.

Preparation of Cathode Layer

Materials forming a cathode active material layer 12, such as a cathode active material, a conducive agent, a binder, and a solid electrolyte are added to a non-polar solvent to prepare a slurry. The slurry is coated and dried on a cathode current collector 11 to prepare a laminate. The obtained laminate is pressed to prepare a cathode layer 10. The pressing of the laminate may be performed by using a roll press, a flat press, or an isotactic press, but is not limited thereto, and any pressing method available in the art may be used. The pressing operation may be omitted. In some embodiments, a mixture of materials forming the cathode active material layer 12 is densification-molded in the form of a pellet or extension-molded in the form of sheet to prepare a cathode layer 10. When the cathode layer 10 is prepared In this manner, a cathode current collector 11 may be omitted.

Preparation of all-Solid Secondary Battery

A solid electrolyte layer 30 is prepared by using, for example, the solid electrolyte formed of the sulfide-based electrolyte material described above. The solid electrolyte layer (30) is prepared by, for example, mixing, coating, drying, and pressing a sulfide-based solid electrolyte, a solvent, and a binder. In some embodiments, the sulfide-based solid electrolyte prepared by using the method of preparing a sulfide-based solid electrolyte may be vapor-deposited by using a common film-forming method such as an aerosol deposition method, a cold spray method, or a sputtering method to prepare a solid electrolyte layer (30). In some embodiments, the solid electrolyte layer (30) may be prepared by pressing of a simple substance of the solid electrolyte particles.

Preparation of all-Solid Secondary Battery

The cathode layer 10, the anode layer 20, and the solid electrolyte layer 30 prepared by using the method are stacked to arrange the solid electrolyte layer 30 between the cathode layer 10 and the anode layer 20 and then pressed to prepare an all-solid secondary battery 1.

For example, the solid electrolyte layer 30 is disposed on the cathode layer to prepare a second stack. Subsequently, the anode layer 20 is disposed on the second stack to make the solid electrolyte layer 30 come in contact with the first anode active material layer to prepare a third stack, and the all-solid secondary battery (10) is prepared by pressing the third stack. The pressing may be performed at a temperature, for example, in a range from room temperature to 90° C., or about 20° C. to about 90° C. In some embodiments, the pressing may be performed at a high temperature of about 100° C. or higher. The pressing is performed, for example, for 30 minutes or less, 20 minutes or less, 15 minutes or less, or 10 minutes or less. The pressing is performed, for example, for 1 ms to 30 minutes, 1 ms to 20 minutes, 1 ms to 15 minutes, or 1 ms to 10 minutes. A pressing method is performed by using a roll press, a flat press, or an isotactic press, but is not limited thereto, and any pressing method available in the art may be used. A pressure for the pressing may be, for example, 500 MPa or lower, 450 MPa or lower, about 350 MPa or lower, about 300 MPa or lower, about 200 MPa or lower, about 150 MPa or lower, or about 100 MPa or lower. A pressure for the pressing may be, for example, about 50 MPa to about 500 MPa, about 50 MPa to about 300 MPa, about 50 MPa to about 150 MPa, or about 50 MPa to about 100 MPa. The solid electrolyte powder is sintered by the pressing and forms one solid electrolyte.

As described above, the structure and the preparation method of the all-solid secondary battery are examples of an embodiment, where members of the structure and the preparation processes may be appropriately modified.

An all-solid secondary battery may be manufactured by the processes of: providing a cathode layer containing a solid electrolyte; providing an anode layer; preparing a first solid electrolyte layer and a second solid electrolyte layer using a composition for the first solid electrolyte layer, the composition containing a first solid electrolyte and a binder, and a composition for the second solid electrolyte layer, the composition containing a second solid electrolyte and a binder, respectively; and sequentially stacking the cathode layer, the first solid electrolyte layer, the second solid electrolyte layer, and the anode layer.

In the preparing of the first solid electrolyte layer and the second solid electrolyte layer, the composition for the first solid electrolyte layer and the composition for the second solid electrolyte layer are applied onto a substrate and heat-treated to prepare the first solid electrolyte layer and the second solid electrolyte layer. When the first solid electrolyte layer and the second solid electrolyte layer are formed by such simultaneous application and heat treatment, the manufacturing process is simplified.

The solid electrolyte may be prepared by atomizing a solid electrolyte precursor to 3 μm or less to obtain an atomized solid electrolyte precursor and heat-treating the atomized solid electrolyte precursor at about 350° C. to about 500° C.

The first solid electrolyte layer and the second solid electrolyte layer may be formed at the same time as described above. Alternatively, the first solid electrolyte layer may be prepared by separately applying and drying the composition for forming the first solid electrolyte layer on the cathode layer, and the second solid electrolyte layer may be prepared by separately applying and drying the composition for forming the second solid electrolyte layer on the substrate. Alternatively, the second solid electrolyte layer may be prepared by peeling the second solid electrolyte layer from the substrate. Here, a polyethylene non-woven fabric or a polypropylene non-woven fabric may be used as the substrate, and when the substrate is not removed, the substrate may be disposed adjacent to the cathode layer.

In the all-solid secondary battery according to an embodiment, as the interface resistance between the cathode layer and the solid electrolyte layer decreases, the deposition and desorption of lithium metal may occur reversibly, and the formation of dendrite may be suppressed to prevent a short circuit of the cell and realize long lifetime characteristics.

The all-solid secondary battery according to an embodiment may be mounted on a small ITS or a large electric vehicle depending on the capacity and size of the battery.

The present disclosure will be described in more detail through the following Examples and Comparative Examples. However, the scope of the present disclosure is not limited thereto.

Preparation of Sulfide-Based Solid Electrolyte

Preparation Example 1: Preparation of Small-Particle $Li_{5.72}Cu_{0.03}PS_{4.75}Cl_{1.25}$ Using Atomized Precursors $Li_2S$ as a lithium precursor, $P_2S_5$ as a phosphorus precursor, LiCl as a chlorine precursor, and $Cu_2S$ as a copper precursor were combined at a stoichiometric ratio in a glove box under an Ar atmosphere to obtain a target composition $(Li_{5.72}Cu_{0.03})PS_{4.75}Cl_{1.25}$, pulverized at 100 rpm for 1 hour by a planetary mill including zirconia (YSZ) balls under an Ar atmosphere, and then mixed with each other. Subsequently, the mixture was further pulverized and mixed at 800 rpm for 30 minutes to obtain an atomized precursor mixture. The average diameter (D50) of the atomized precursor mixture is about 2 μm. Specifically, the average diameter (D50) of the atomized precursors ($Li_2S$ and $P_2S_5$) is 1.5 μm, and the average diameter (D50) of the atomized precursor (LiCl) is about 2.5 μm.

The obtained atomized precursor mixture was uniaxially pressed to prepare a pellet having a thickness of about 10 mm and a diameter of about 13 mm. The prepared pellet was covered with a gold foil and then put into a carbon crucible, and the carbon crucible was sealed in vacuum using a quartz glass tube. The vacuum-sealed pellet was heated from room temperature (25° C.) to 440° C. at a temperature increase rate of 1.0° C./min, heat-treated at 440° C. for 12 hours, and then cooled to room temperature at a temperature decrease rate of 1.0° C./min to obtain a small-particle sulfide-based solid electrolyte $(Li_{5.72}CU_{0.03})PS_{4.75}Cl_{1.25}$.

Preparation Example 2: Preparation of Large-Particle $Li_{5.72}Cu_{0.03}PS_{4.75}Cl_{1.25}$ Using Atomized Precursors A large-particle sulfide-based solid electrolyte $Li_{5.72}Cu_{0.03}PS_{4.4}Cl_{1.4}Br_{0.2}$ was obtained in the same manner as in Preparation Example 1, except that LiBr was further added so as to obtain $Li_{5.72}Cu_{0.03}PS_{4.4}Cl_{1.4}Br_{0.2}$ when preparing the precursor mixture, the contents of $Li_2S$, $P_2S_5$, LiCl and LiBr were stoichiometrically controlled, the heat treatment was carried out at 420° C., and the average diameter ($D_{50}$) of the atomized precursors was about 2.25 μm.

The average diameter ($D_{50}$) of the atomized precursor mixture is about 2.5 μm. Specifically, the average diameter ($D_{50}$) of the atomized precursors ($Li_2S$ and $P_2S_5$) is 2.5 μm, and the average diameter ($D_{50}$) of the atomized precursor (LiCl) is about 1.5 μm.

Preparation Example 3: Preparation of Solid Small-Particle $Li_{5.72}Cu_{0.03}PS_{4.75}Cl_{1.25}$ without Using Atomized Precursors $Li_2S$ as a lithium precursor, $P_2S_5$ as a phosphorus precursor, LiCl as a chlorine precursor, and $Cu_2S$ as a copper precursor were combined at a stoichiometric ratio in a glove box under an Ar atmosphere so as to obtain a target composition $(Li_{5.72}Cu_{0.03})PS_{4.75}Cl_{1.25}$ to obtain a precursor mixture.

The obtained precursor mixture was uniaxially pressed to prepare a pellet having a thickness of about 10 mm and a diameter of about 13 mm. The prepared pellet was covered with a gold foil and then put into a carbon crucible, and the carbon crucible was sealed in vacuum using a quartz glass tube. The vacuum-sealed pellet was primarily heat-treated at 300° C. for 12 hours at a temperature increase rate of 1.0° C./min, and secondarily heat-treated at 500° C. for 12 hours at a temperature increase rate of 1.0° C./min. Then, the heat-treated pellet was cooled to room temperature at a temperature decrease rate of 1.0° C./min to obtain a small-particle sulfide-based solid electrolyte $(Li_{5.72}Cu_{0.03})PS_{4.75}Cl_{1.25}$ having an average particle diameter of about 2.5 μm.

Preparation Example 4: Preparation of Solid Small-Particle $Li_{5.72}Cu_{0.03}PS_{4.4}Cl_{1.6}$ without Using Atomized Precursors A small-particle sulfide-based solid electrolyte $Li_{5.72}Cu_{0.03}PS_{4.4}Cl_{1.6}$ having an average particle diameter of about 2.5 mm was obtained in the same manner as in Preparation Example 3, except that LiBr was further added when preparing the precursor mixture, and the contents of Li$_2$S, P$_2$S$_5$, LiCl and LiBr were stoichiometrically controlled so as to obtain Li$_{5.72}$Cu$_{0.03}$PS$_{4.4}$Cl$_{1.6}$.

Example 1

A large-particle cathode active material LiNi$_{0.8}$Co$_{0.15}$Al$_{0.05}$O$_2$ (NCA)(D50=14 μm), a small-particle cathode active material LiNi$_{0.8}$Co$_{0.15}$Al$_{0.05}$O$_2$ (NCA) (D50=5 μm), carbon nanofiber as a conductive agent, polytetrafluoroethylene as a binder, and the solid electrolyte (Li$_{5.72}$Cu$_{0.03}$)PS$_{4.75}$Cl$_{1.25}$ (hereinafter, fine Cu) (mixture of secondary particles (D50=3 μm) and primary particles (D50=0.5-1p m)) prepared in Preparation Example 1 as an electrode for a cathode were mixed to obtain a mixture, and xylene was added to the mixture to obtain a composition for a cathode layer, and the composition was molded in the form of a sheet using a dry kneading method to prepare a cathode sheet.

The mixing weight ratio of the large-particle cathode active material and the small-particle cathode active material is 3:1, and the mixing weight ratio of the cathode active material, the conductive agent, the binder, and the solid electrolyte is 84:0.2:1.0:14.8.

The cathode sheet was pressed to a cathode current collector formed of an aluminum foil having a thickness of 18 μm, put into a batch-type oil chamber, and subjected to a warm isotactic pressing process using a pressure of 490 mPa to form a pressed cathode layer.

Separately, a nickel (Ni) foil (thickness: 10 μm) was prepared as an anode current collector. As an anode active material, a mixture in which silver (primary particle diameter: 60 nm) and carbon black powder (primary particle diameter: 35 nm) are mixed at a weight ratio of 25:75 was prepared. A polyvinylidene fluoride binder (#9300, manufactured by Kureha Corporation) was introduced into N-methylpyrrolidone (NMP) in an amount of 7 wt % based on an anode layer together with silver (primary particle diameter: 60 nm) and carbon black powder (primary particle diameter: 35 nm), and stirred to prepare a slurry for forming an anode layer. The slurry for forming an anode layer was applied onto the Ni foil using a blade coater, dried in air at 80° C. for 20 minutes, and dried in vacuum at 100° C. for 12 hours to prepare an anode layer.

Acrylic resin (manufactured by Xeon Corporation) as a binder was added to the small-particle sulfide-based solid electrolyte (Li$_{5.72}$Cu$_{0.03}$)PS$_{4.75}$Cl$_{1.25}$ (hereinafter, a mixture of fine (Cu) powder (secondary particles (D50=3 μm)) and primary particles (D50=0.5 μm to1 μm)) prepared in Preparation Example 1 to prepare a mixture, and the mixing weight ratio of the small-particle sulfide-based solid electrolyte and the acrylic resin is 98.5:1.5. Isobutyl isobutyrate (IBIB) as a solvent was added to the mixture and stirred to prepare a composition for forming a first solid electrolyte layer.

Acrylic resin (manufactured by Xeon Corporation) as a binder was added to the large-particle sulfide-based solid electrolyte Li$_{5.72}$Cu$_{0.3}$PS$_{4.4}$Cl$_{1.4}$Br$_0$. (hereinafter, a mixture of fine (CuCl$_{1.4}$Br$_{0.2}$) powder (secondary particles (D50=6 μm)) and primary particles (D50=about 2 μm)) prepared in Preparation Example 2, and octyl acetate as a solvent was added thereto to prepare a composition for forming a second solid electrolyte layer. Here, the mixing weight ratio of the large-particle sulfide-based solid electrolyte and the acrylic resin is 99:1

The composition for forming the first solid electrolyte layer and the composition for forming the second solid electrolyte layer were placed on polyethylene nonwoven fabrics, respectively, and two blades with different gaps moved. These compositions were dried in the air of a dry room at 25° C. for 12 hours and dried in vacuum at 70° C. for 2 hours to form a first solid electrolyte layer and a second solid electrolyte each having a sheet shape on the polyethylene nonwoven fabrics, respectively.

The cathode layer, the polyethylene nonwoven fabric, the first solid electrolyte layer, the second solid electrolyte layer, and the anode layer, which were obtained in the above process, were sequentially stacked, and were subjected to a isotactic pressing by a pressure of 500 MPa at 85° C. for 30 minutes to manufacture an all-solid secondary battery. In the all-solid secondary battery, the thickness of the first solid electrolyte layer after pressing is about 15 μm, and the thickness of the second solid electrolyte layer after pressing is about 30 μm. The thickness ratio of the first solid electrolyte layer and the second solid electrolyte layer is 1:2.

In Example 1, the difference in bromine content between the first solid electrolyte and the second solid electrolyte is 0.2 atomic %.

Example 2

An all-solid secondary battery was manufactured in the same manner as in Example 1, except that a third solid electrolyte layer was disposed on the second solid electrolyte layer by performing the following process of simultaneously forming the first solid electrolyte layer, the second solid electrolyte layer, and the third solid electrolyte layer instead of the above process of simultaneously forming the first solid electrolyte layer and the second solid electrolyte layer.

A composition for forming a third solid electrolyte layer was the same as the composition for forming a first solid electrolyte layer.

The composition for forming a first solid electrolyte layer, the composition for forming a second solid electrolyte layer, and the composition for forming a third solid electrolyte layer were placed on polyethylene nonwoven fabrics, respectively, and three blades with different gaps moved. These compositions were dried in the air of a dry room at 25° C. for 12 hours and dried in vacuum at 70° C. for 2 hours to form a first solid electrolyte layer, a second solid electrolyte, and a third solid electrolyte layer each having a sheet shape on the polyethylene nonwoven fabrics, respectively.

An all-solid secondary battery was manufactured in the same manner as in Example 1, except that Li$_{5.72}$Cu$_{0.3}$PS$_{4.75}$Cl$_{1.25}$ powder (a mixture of secondary particles (D50=2.9 μm) and primary particles (D50=0.5 μm to 1 μm)) was used as first solid electrolyte and third solid electrolyte when preparing the first solid electrolyte layer and the third solid electrolyte layer, and that Li$_{5.72}$Cu$_{0.3}$PS$_{4.4}$Cl$_{1.4}$Br$_{0.2}$ powder (a mixture of secondary particles (D50=6 μm) and primary particles (D50=2 μm)) was used as second solid electrolyte when preparing the second solid electrolyte layer.

In the all-solid secondary battery, the thickness of the first solid electrolyte layer after pressing is about 15 μm, the thickness of the second solid electrolyte layer after pressing is about 30 μm, and the thickness of the third solid electrolyte layer after pressing is about 15 μm. The thickness ratio of the first solid electrolyte layer, the second solid electrolyte layer, and the third solid electrolyte layer is 1:2:1.

Comparative Example 1

A large-particle cathode active material LiNi$_{0.8}$Co$_{0.15}$Al$_{0.05}$O$_2$ (NCA)(D50=14 μm), a small-particle cathode active material $LiNi_{0.8}Co_{0.15}Al_{0.05}O_2$ (NCA) (D50=5 μm), carbon nanofiber as a conductive agent, polytetrafluoroethylene as a binder, and a sulfide-based solid electrolyte for a cathode (D50=3 μm) were mixed to obtain a mixture, and xylene was added to the mixture to obtain a composition for a cathode layer, and the composition was molded in the form of a sheet using a doctor blade method to prepare a sheet-shaped cathode layer Argyrodite-type $LiCl$—$Li_2S$—$Li_3PS_4$—$Cu_2S$ is used as the sulfide-based solid electrolyte, and the mixing weight ratio of the large-particle cathode active material and the small-particle cathode active material is 3:1. The mixing weight ratio of the cathode active material, the conductive agent, the binder, and the sulfide-based solid electrolyte is 84:0.2:1.0:14.8.

The cathode sheet was pressed to a cathode current collector formed of an aluminum foil having a thickness of 18 μm, put into a batch-type oil chamber, and subjected to a warm isotactic pressing process using a pressure of 490 mPa to form a pressed cathode layer.

Separately, a nickel (Ni) foil (thickness: 10 μm) was prepared as an anode current collector. As an anode active material, a mixture in which silver (primary particle diameter: 60 nm) and carbon black powder (primary particle diameter: 35 nm) are mixed at a weight ratio of 25:75 was mixture and stirred to prepare a composition for forming a solid electrolyte layer. The composition for forming a solid electrolyte layer was applied onto a polyethylene terephthalate film using a blade, dried in the air of a dry room at 25° C. for 12 hours, dried in vacuum at 70° C. for 2 hours, and separated from the polyethylene terephthalate film to obtain a sheet-shaped solid electrolyte layer having a thickness of 60 μm.

The cathode layer, the solid electrolyte layer, and the anode layer, which were obtained in the above process, were sequentially stacked, and were subjected to a isotactic pressing by a pressure of 500 MPa at 25° C. for 30 minutes to manufacture an all-solid secondary battery. In the all-solid secondary battery, the thickness of the solid electrolyte layer after pressing is 45 μm.

Comparative Examples 2 to 4

All-solid secondary batteries were manufactured in the same manner as in Comparative Example 1, except that each conditions was changed as shown in Table 2.

Comparative Example 5

An all-solid secondary battery was manufactured in the same manner as in Example 1, except that each conditions was changed as shown in Table 2.

TABLE 1

| Cathode layer | | | | First solid electrolyte layer | | Second solid electrolyte layer | | | Third solid electrolyte layer Composition |
|---|---|---|---|---|---|---|---|---|---|
| Large-particle active material D50 (um) | Small-particle active material D50 (um) | SE Secondary particle D50 (um) | SE Primary particle D50 (um) | Composition | D50 (um) | Composition | SE Secondary particle D50 (um) | SE Primary particle D50 (um) | |
| 14 | 5.5 | 2.9 | 0.5-1 μm | Fine Cu | 2.9 | Fine $CuCl_{1.4}Br_{0.2}$ | 6.0 | 2 | — |
| 14 | 5.5 | 2.9 | 0.5-1 μm | Fine Cu | 2.9 | Fine $CuCl_{1.4}BBr_{0.2}$ | 6.0 | 2 | Cu |
| 14 | 5.5 | 2.9 | — | Fine $CuCl_{1.4}Br_{0.2}$ | 6.0 | | | | — |
| 14 | 5.5 | 2.9 | — | Fine Cu | 2.8 | | | | |
| 14 | 5.5 | 2.9 | X | Solid Cu | 2.5 | | | | — |
| 14 | 5.5 | 2.9 | X | Solid $CuCl_6$ | 2.6 | | | | — |
| 14 | 5.5 | 2.9 | | Fine $CuCl_{1.4}Br_{0.2}$ | 6 | Fine Cu | 2.9 | 0.5-1 μm | — | prepared. A polyvinylidene fluoride binder (#9300, manufactured by Kureha Corporation) was introduced into N-methylpyrrolidone (NMP) in an amount of 7 wt % based on an anode layer together with silver (primary particle diameter: 60 nm) and carbon black powder (primary particle diameter: 35 nm), and stirred to prepare a slurry for forming an anode layer to prepare a slurry for forming an anode layer. The slurry for forming an anode layer was applied onto the Ni foil using a blade coater, dried in air at 80° C. for 20 minutes, and dried in vacuum at 100° C. for 12 hours to prepare an anode layer.

Acrylic resin (manufactured by Xeon Corporation) as a binder was added to $Li_{5.72}Cu_{0.03}PS_{4.4}Cl_{1.4}Br_{0.2}$ (hereinafter, $CuCl_{1.4}Br_{0.2}$ powder (D50=6 μm)) prepared in Preparation Example 1 at a weight ratio of 98.5:1.5 to prepare a mixture, and the mixing weight ratio of the $CuCl_{1.4}Br_{0.2}$ powder and the acrylic resin is 98.5:1.5. Octyl acetate was added to the In Table 1 above, the first solid electrolyte of each of the first solid electrolyte layers of Examples 1 and 2 exhibited the same particle size and particle size distribution characteristics as the solid electrolyte of each of the cathode layers thereof. Further, the third solid electrolyte of the third solid electrolyte layer of Example 2 exhibited the same particle size and particle size distribution characteristics as the solid electrolyte of the cathode layer thereof.

Examples 3 to 5

All-solid secondary batteries were manufactured in the same manner as in Example 1, except that each conditions was changed as shown in Table 2.

TABLE 2

| Class. | Cathode layer | | | | First solid electrolyte layer | | Second solid electrolyte layer | | | Third solid electrolyte layer | |
|---|---|---|---|---|---|---|---|---|---|---|---|
| | Large-particle active material D50 (um) | Small-particle active material D50 (um) | SE Secondary particle D50 (um) | SE Primary particle D50 (um) | Composition | D50 (um) | Composition | SE Secondary particle D50 (um) | SE Primary particle D50 (um) | Composition | D50 (um) |
| Example 3 | 14 | 5.5 | 2.9 | 0.5-1 μm | Fine Cu | 2.9 | Fine $CuCl_{1.4}Br_{0.2}$ | 10.0 | 2 | — | |
| Example 4 | 14 | 5.5 | 2.9 | 0.5-1 μm | Fine Cu | 2.9 | Fine $CuCl_{1.4}Br_{0.2}$ | 10.0 | 2 | — | |
| Example 5 | 14 | 5.5 | 2.9 | 0.5-1 μm | Fine Cu | 2.9 | Fine $CuCl_{1.4}Br_{0.2}$ | 10.0 | 2 | Cu | 2.9 |

Examples 6 and 7

All-solid secondary batteries were manufactured in the same manner as in Example 1, except that the sizes of large-particle cathode active material and small-particle cathode active material in the cathode layer were changed as given in Table 3.

TABLE 3

| Class. | Large-particle active material D50 (um) | Small-particle active material D50 (um) |
|---|---|---|
| Example 6 | 20 | 5.5 |
| Example 7 | 14 | 1 |

As given in Table 4 below, an all-solid secondary battery was manufactured in the same manner as in Example 1, except that solid Cu prepared in Preparation Example 3 was used when preparing the cathode layer and the first electrolyte layer, and that solid $CUCl_{1.4}Br_{0.2}$ prepared in Preparation Example 4 was used when preparing the second electrolyte layer.

Example 9

As given in Table 4 below, an all-solid secondary battery was manufactured in the same manner as in Example 1, except that solid Cu prepared in Preparation Example 3 was used when preparing the cathode layer, the first electrolyte layer, and the third solid electrolyte layer, and that solid $CUCl_{1.4}Br_{0.2}$ prepared in Preparation Example 4 was used when preparing the second electrolyte layer.

According to Examples 8 and 9, the solid electrolyte, first solid electrolyte and third solid electrolyte prepared using atomized precursors were not used as compared with Examples 1 and 2. The all-solid secondary batteries of Examples 8 and 9 have a smaller interface contact area between the cathode and the solid electrolyte membrane as compared to the all-solid secondary batteries of Examples 1 and 2.

Evaluation Example 1: Ion Conductivity and SEM-EDS Analysis

In Example 3, the solid electrolyte for a cathode, the first solid electrolyte, and the second solid electrolyte were pulverized using an agate mortar to prepare a powder, and then 200 mg of the powder was pressed by a pressure of 4 ton/cm$^2$ for 2 minutes to a pellet sample having a thickness of about 0.101 mm and a diameter of about 13 mm. Indium (in) electrodes a thickness of 50 μm and a diameter of 13 mm were placed on both sides of the prepared sample, respectively, to prepare a symmetry cell. The preparation of the symmetric cell was carried out in a gloverbox under an Ar atmosphere.

Impedance of the sample provided on both sides thereof with indium electrodes was measured using an impedance analyzer (Material Mates 7260 impedance analyzer) by a 2-probe method. The frequency range was about 0.1 Hz to about 1 MHz, and the amplitude voltage was 10 mV. The impedance thereof was measured at 25° C. under an Ar atmosphere. Resistance values were obtained from the arc of the Nyguist plot for the measurement result of impedance, and ion conductivity was calculated by considering the area and thickness of the sample.

TABLE 4

| Class. | Cathode layer | | | First solid electrolyte layer | | | Second solid electrolyte layer | | | Third solid electrolyte layer | | |
|---|---|---|---|---|---|---|---|---|---|---|---|---|
| | Large-particle active material D50 (um) | Small-particle active material D50 (um) | SE Secondary particle D50 (um) | Composition | D50 (um) | Thickness (um) | Composition | D50 (um) | Thickness (um) | Composition | D50 (um) | Thickness (um) |
| Example 8 | 14 | 5.5 | 2.9 | Cu | 2.9 | 15 | $CuCl_{1.4}Br_{0.2}$ | 6.0 | 30 | | | |
| Example 9 | 14 | 5.5 | 2.9 | Cu | 2.9 | 15 | $CuCl_{1.4}Br_{0.2}$ | 6.0 | 30 | Cu | 2.9 | 15 |

Figure 2:
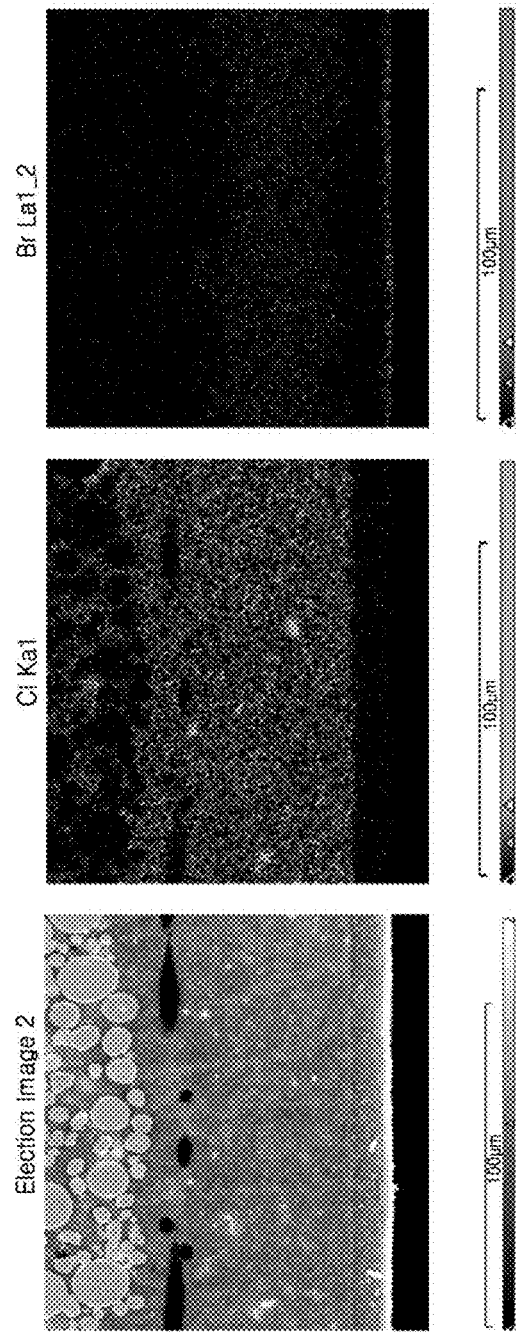
FIG. 2 illustrates the results of scanning electron microscope-energy dispersive X-ray Spectrometer (SEM-EDX) analysis of an all-solid secondary battery according to an embodiment.

The measurement results of ion conductivity are shown in Table 5 below. Further, SEM-EDS analysis of the all-solid secondary battery of Example 3 was performed to investigate the stacking state and composition of each layer. The SEM-EDS analysis was performed using S-4700 of Hitachi Corporation. FIG. 2 is an SEM analysis photograph and is an EDAX analysis photograph capable of confirming the components of carbon, chlorine and bromine.

TABLE 5

|  | Composition | Average particle diameter (D50) (μm) | Ion conductivity at room temperature (25° C.) [mS/cm] |
|---|---|---|---|
| Cathode solid electrolyte | $Li_{5.72}Cu_{0.03}P_{4.75}Cl_{1.25}$ | 2.9 | 3.85 |
| First solid electrolyte | $Li_{5.72}Cu_{0.03}P_{4.75}Cl_{1.25}$ | 2.9 | 3.85 |
| Second solid electrolyte | $Li_{5.72}Cu_{0.3}PS_{4.4}Cl_{1.4}Br_{0.2}$ | 6.0 | 7.0 |

As shown in Table 5, each electrolyte exhibited a high ionic conductivity of 1.8 mS/cm or more at room temperature.

As shown in FIG. 2, it may be found that the cathode layer and the first solid electrolyte layer, and the anode layer and the second solid electrolyte layer were in close contact with each other at the interface. Further, elemental components existing in the solid electrolyte in the cathode layer, the first solid electrolyte layer adjacent to the cathode layer, and the second solid electrolyte layer adjacent to the anode layer were confirmed. It may be found that bromine exists in the second solid electrolyte layer, and chlorine exists in the first solid electrolyte layer and the cathode layer.

Evaluation Example 2: Charge/Discharge Characteristics (Reversible Capacity and Energy Density)

(1) Examples 1 and 2 and Comparative Examples 1 to 3

Charge/discharge characteristics of the all-solid secondary batteries of Examples 1 and 2 and Comparative Examples 1 to 3 were evaluated by the following charge/discharge test. The charge/discharge test was performed by placing the all-solid secondary battery in a thermostatic bath at 45° C.

After the all-solid secondary battery was charged with a constant current until the voltage became 4.25 V (vs. Li) at a rate of 0.1 C (C-rate), the all-solid secondary battery was cut-off at a rate of 0.05 C while maintaining the voltage at 4.25 V (vs. Li). Subsequently, the all-solid secondary battery was discharged at a rate of 0.1 C until the voltage reached 2.5 V (vs. Li) (formation process, $1^{st}$ cycle). The all-solid secondary battery having under gone the formation process was charged at a rate of 0.1 C until the voltage became 4.25 V (vs. Li), and then discharged at a rate of 0.33 C until the voltage reached 2.5 V (vs. Li). Then, the all-solid secondary battery was further charged at a rate of 0.1 C until the voltage became 4.25 V (vs. Li), and then discharged at a rate of 0.33 C until the voltage reached 2.5 V (vs. Li).

Figure 3A:
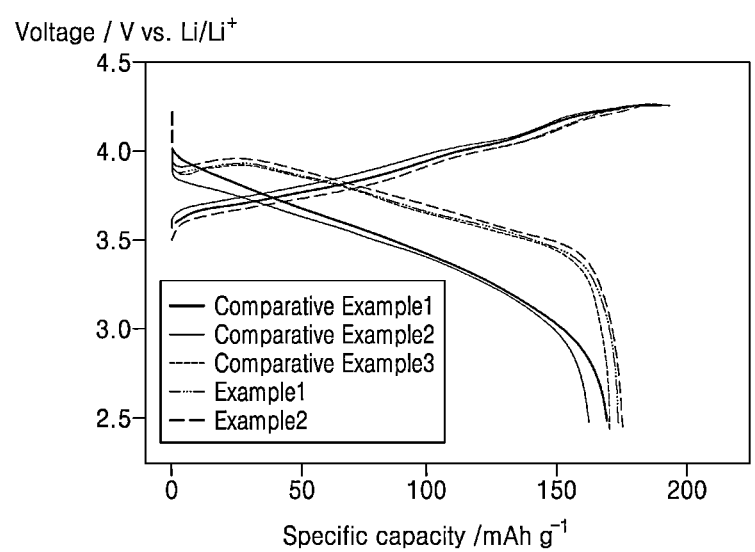
FIG. 3A illustrates voltage changes with respect to specific capacity in the all-solid secondary batteries of Example 1-2 and Comparative Example 1-3.
Figure 3B:
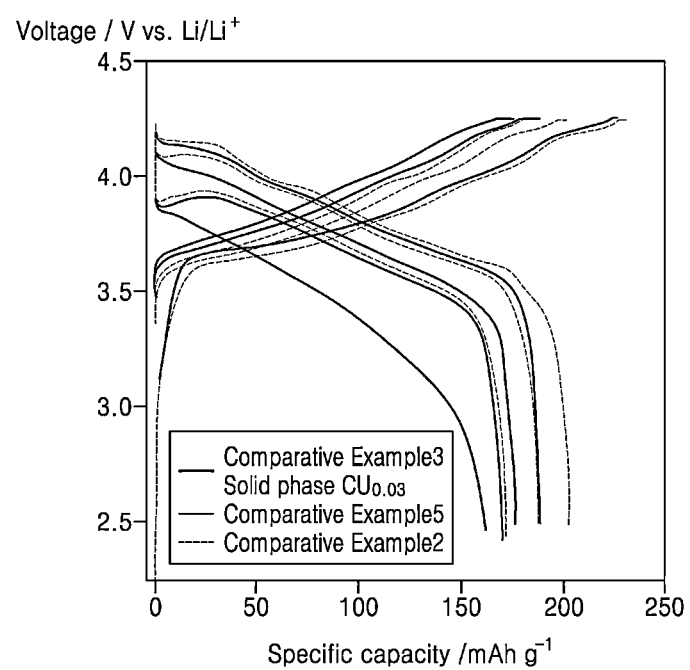
FIG. 3B illustrates voltage changes with respect to specific capacity in the all-solid secondary batteries of Comparative Examples 2, 3, and 5.
Figure 4A:
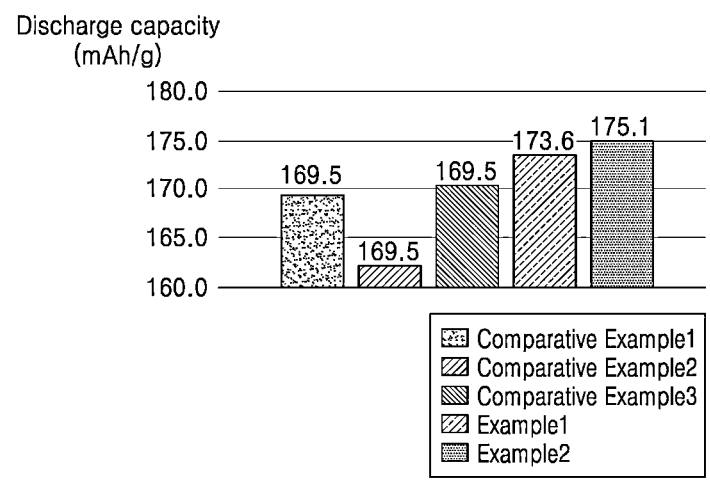
FIG. 4A illustrates discharge capacity changes in the all-solid secondary batteries according to Examples 1 and 2 and Comparative Examples 1 to 3.
Figure 4B:
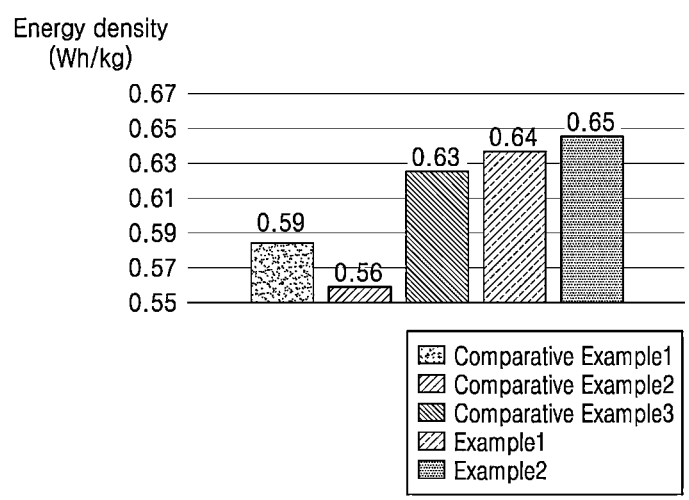
FIG. 4B illustrates energy density changes in the all-solid secondary batteries according to Examples 1 and 2 and Comparative Examples 1 to 3.

Some of the results thereof are shown in FIGS. 3A, 4A, and 4B.

Referring to FIGS. 4A and 4B, as a result of evaluating charge/discharge cycle characteristics of the all-solid secondary batteries of Examples 1 and 2 at a rate of 0.1 C, the all-solid secondary batteries of Examples 1 and 2 exhibited high reversible capacity and energy density as shown in FIGS. 4A and 4B.

(2) Comparative Examples 2, 3, and 5

Evaluation of the charge/discharge characteristics of the all-solid secondary batteries of Comparative Examples 2, 3, and 5 were performed in the same manner as the evaluation of the charge/discharge characteristics of the all-solid secondary battery of Example 1.

As a result of evaluation, the all-solid secondary batteries of Comparative Examples 2, 3, and 5 exhibited lower charge/discharge characteristics compared to the case of Example 1.

Evaluation Example 3: High-Rate Characteristics

Charge/discharge characteristics of the all-solid secondary batteries of Examples 1 and 2 and Comparative Examples 1 and 2 were evaluated by the following charge/discharge test. The charge/discharge test was performed by placing the all-solid secondary battery in a thermostatic bath at 45° C.

After the all-solid secondary battery was charged with a constant current until the voltage became 4.25 V (vs. Li) at a rate of 0.1 C (C-rate), the voltage was maintained until a current reached 1/20 C. Then, the all-solid secondary battery was discharged at a rate of 0.33 C until the voltage reached 2.5 V (vs. Li). Thereafter, the test rested for 10 minutes. Subsequently, in the second and subsequent cycles, each all-solid secondary battery is charged with a constant current until the voltage reached 4.25 V (vs. Li) at a rate of 0.1 C at the same temperature and then the voltage was maintained until the current reached 1/20 C. Then, the all-solid secondary battery was discharged at a rate of 1.0 C until the voltage became 2.5 V (vs. Li). Some of the results are shown in Table 6 below.

Figure 4C:
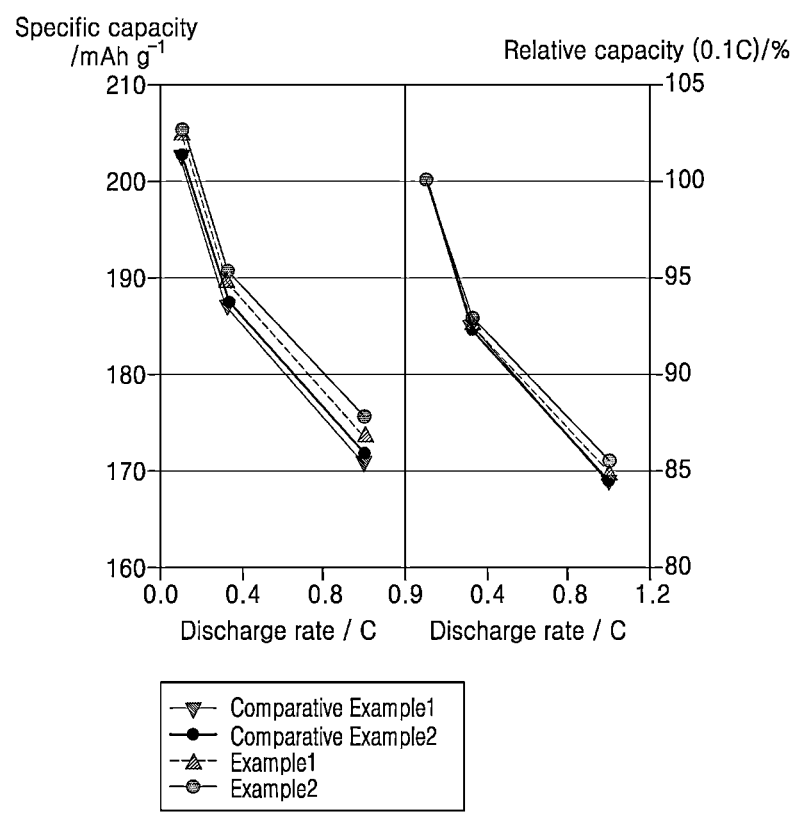
FIG. 4C illustrates specific capacity changes and relative capacity changes in the all-solid secondary batteries according to Examples 1 and 2 and Comparative Examples 1 and 2.

High-rate characteristics were evaluated according to Equation 1 below, and the evaluation results thereof are shown in FIG. 4C.

High-rate characteristics (%)=[(discharge capacity of 1.0C)/(discharge capacity of 0.33C)]X100%     Equation 1

TABLE 6

| | | Conditions of 0.1C and 2.5V to 4.25V | | | Conditions of 1C and 2.5V to 4.25V Discharge | | |
|---|---|---|---|---|---|---|---|
| Class. | | Discharge capacity (mAh/g) | Average voltage (V) | Energy density (Wh/kg) | capacity (mAh/g) (@1C, 4.25V) | Average voltage (V) | Energy density (Wh/kg) |
| Comparative Example 1 | | 204.3 | 3.80 | 0.78 | 169.5 | 3.45 | 0.59 |

TABLE 6-continued

| | Conditions of 0.1C and 2.5V to 4.25V | | | Conditions of 1C and 2.5V to 4.25V | | |
|---|---|---|---|---|---|---|
| Class. | Discharge capacity (mAh/g) | Average voltage (V) | Energy density (Wh/kg) | Discharge capacity (mAh/g) (@1C, 4.25V) | Average voltage (V) | Energy density (Wh/kg) |
| Comparative Example 2 | 189.2 | 3.82 | 0.72 | 162.3 | 3.44 | 0.56 |
| Comparative Example 3 | 202.5 | 3.82 | 0.77 | 170.6 | 3.67 | 0.63 |
| Example 1 | 204.7 | 3.82 | 0.78 | 173.6 | 3.67 | 0.64 |
| Example 2 | 205.1 | 3.82 | 0.78 | 175.1 | 3.69 | 0.65 |

Referring to Table 6, the all-solid secondary batteries of Examples 1 and 2 exhibited a maximum discharge capacity of 204.7mAh/g to 205.1mAh/g at a discharge rate 0.1 C, and exhibited a very high reversible capacity of 173.6mAh/g to 175.1 mAh/g.

Evaluation Example 4: Scanning Electron Microscope (SEM) Analysis

Figure 5A:
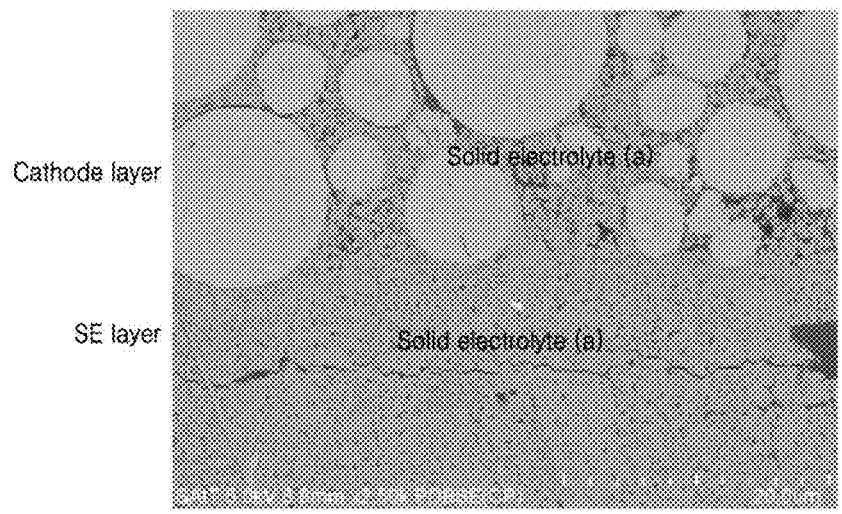
FIG. 5A illustrates an electron scanning microscope (SEM) photograph of a cathode layer/first solid electrolyte layer laminate in the all-solid secondary battery of Example 1.
Figure 5B:
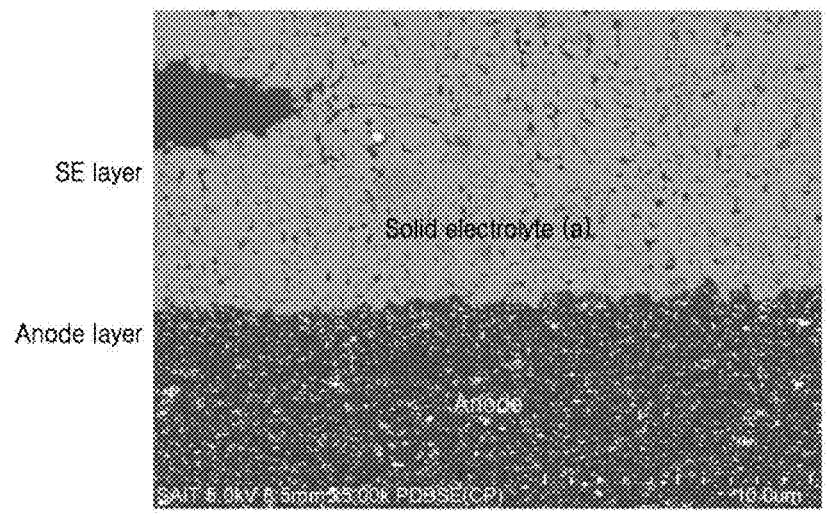
FIG. 5B illustrates an electron scanning microscope (SEM) photograph of a third solid electrolyte layer/anode layer laminate in the all-solid secondary battery of Example 1.
Figure 5C:
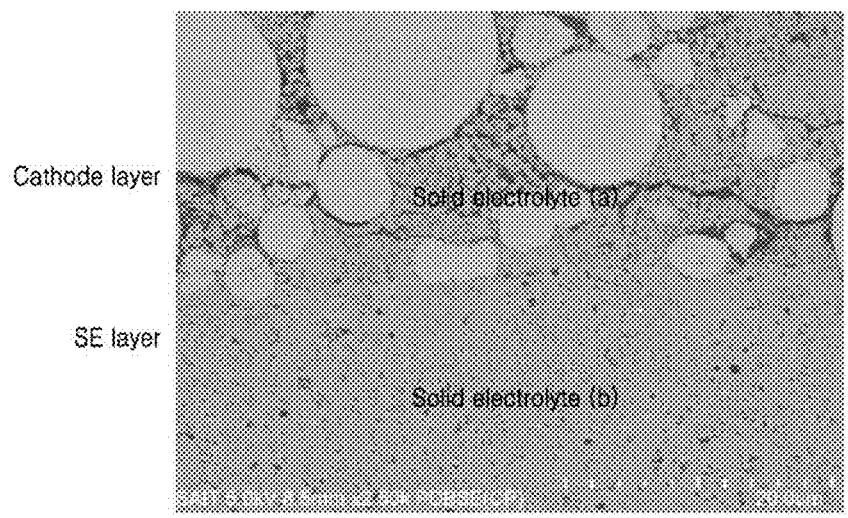
FIG. 5C illustrates an electron scanning microscope (SEM) photograph of a cathode layer/first solid electrolyte layer laminate in the all-solid secondary battery of Comparative Example 1.

In the all-solid secondary batteries of Example 1 and Comparative Example 1, SEM analysis was performed on the interface state between the cathode layer and the solid electrolyte layer adjacent to the cathode layer, and the results thereof are as shown in FIGS. 5A to 5C. FIGS. 5A and 5B illustrate SEM photographs for the all-solid secondary battery of Example 1, and FIG. 5C illustrates an SEM photograph for the all-solid secondary battery of Comparative Example 1. SE in FIGS. 5A to 5C represents a solid electrolyte.

As shown in FIGS. 5A and 5B, the all-solid secondary battery of Example 1 had excellent interfacial characteristics between the cathode layer and the first solid electrolyte layer.

In contrast, the all-solid secondary battery of Comparative Example 2 had poor interfacial characteristics between the cathode layer and the first solid electrolyte layer as compared with the all-solid secondary battery of Example 1.

Evaluation Example 5: Lifetime Characteristics

Lifetime characteristics of the all-solid secondary batteries of Examples 1 and 2 and Comparative 1, 2, and 5 were evaluated. The charge/discharge test was performed by placing the all-solid secondary battery in a chamber at 45° C.

After the all-solid secondary battery was charged with a constant current until the voltage became 4.25 V (vs. Li) at a rate of 0.1 C (C-rate), the voltage was maintained until a current reached 1/50 C. Then, the all-solid secondary battery was discharged at a rate of 0.2 C until the voltage reached 2.5 V (vs. Li). Thereafter, the test rested for 10 minutes. Subsequently, in the second and subsequent cycles, each all-solid secondary battery is charged with a constant current until the voltage reached 4.25 V (vs. Li) at a rate of 0.1 C at the same temperature and then the voltage was maintained until the current reached 1/50 C. Then, the all-solid secondary battery was discharged at a rate of 0.33 C until the voltage became 2.5 V (vs. Li). Some of the results are shown in FIG. 9.

Figure 9:
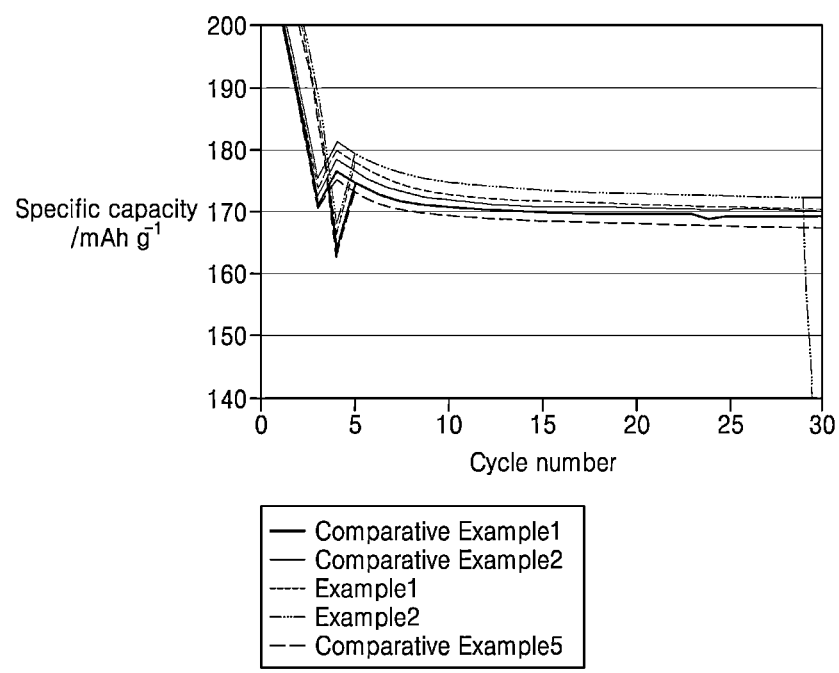
FIG. 9 illustrates the lifetime characteristics of all solid secondary batteries of Examples 1, 2, and 5, and Comparative Examples 1 and 2.

As shown in FIG. 9, in the all-solid secondary batteries of Examples 1 and 2, interfacial stability was improved, and thus high-temperature lifetime characteristics was improved, as compared with the all-solid secondary batteries of Comparative Examples 1, 2 and 5. Further, the all-solid secondary battery of Example 2 exhibited the highest reversible capacity.

Evaluation Example 6: Overvoltage

Overvoltages of the all-solid secondary batteries of Examples 1 and 2 and Comparative Examples 1 and 2 at the time of charging and discharging at a rate of 0.10 C, discharging at a rate of 0.330 and discharging at a rate of 0.10 were compared and observed 0.1 C using an electro-chemical-based galvanostatic intermittent titration technique (GITT) measurement, and the results thereof are shown in FIG. 10 and Tables 7 to 10 below. In Tables 7 to 10, SOC is an abbreviation of state of charge.

TABLE 7

| Class. | SOC (%) | Comparative Example 2 (a) over-voltage (V) | Comparative Example 1 (b) over-voltage (V) | Example 1 (a/b) over-voltage (V) | Example 2 (a/b/a) over-voltage (V) |
|---|---|---|---|---|---|
| 0.1 C charge | 15 | 0.0425 | 0.0445 | 0.0435 | 0.042 |
| | 30 | 0.015 | 0.0165 | 0.015 | 0.0125 |
| | 45 | 0.014 | 0.0145 | 0.0135 | 0.0125 |
| | 60 | 0.0135 | 0.0145 | 0.013 | 0.0135 |
| | 75 | 0.0135 | 0.014 | 0.0125 | 0.0115 |
| | 90 | 0.013 | 0.015 | 0.0135 | 0.012 |
| | 95 | 0.0205 | 0.021 | 0.0195 | 0.018 |

TABLE 8

| Class. | SOC (%) | Comparative Example 2 (a) over-voltage (V) | Comparative Example 1 (b) over-voltage (V) | Example 1 (a/b) over-voltage (V) | Example 2 (a/b/a) over-voltage (V) |
|---|---|---|---|---|---|
| 0.1 C charge | 95 | 0.0225 | 0.023 | 0.0225 | 0.02 |
| | 78 | 0.0125 | 0.0145 | 0.014 | 0.0135 |
| | 60 | 0.014 | 0.014 | 0.014 | 0.0135 |
| | 42 | 0.0135 | 0.014 | 0.013 | 0.0125 |
| | 24 | 0.0155 | 0.0165 | 0.0155 | 0.013 |
| | 5 | 0.063 | 0.0645 | 0.0615 | 0.0595 |

TABLE 9

| Class. | SOC (%) | Comparative Example 2 (a) over-voltage (V) | Comparative Example 1 (b) over-voltage (V) | Example 1 (a/b) over-voltage (V) | Example 2 (a/b/a) over-voltage (V) |
|---|---|---|---|---|---|
| 0.33 C charge | 94 | 0.0995 | 0.103 | 0.1035 | 0.09 |
| | 78 | 0.054 | 0.055 | 0.054 | 0.0485 |
| | 60 | 0.0525 | 0.055 | 0.0535 | 0.047 |
| | 43 | 0.0495 | 0.052 | 0.05 | 0.044 |
| | 26 | 0.056 | 0.057 | 0.055 | 0.049 |
| | 15 | 0.087 | 0.0895 | 0.0815 | 0.0705 |
| | 9 | 0.195 | 0.199 | 0.179 | 0.1575 |

TABLE 10

| Class. | SOC (%) | Comparative Example 2 (a) over-voltage (V) | Comparative Example 1 (b) over-voltage (V) | Example 1 (a/b) over-voltage (V) | Example 2 (a/b/a) over-voltage (V) |
|---|---|---|---|---|---|
| 1.0 C charge | 83 | 0.214 | 0.215 | 0.212 | 0.1975 |
| | 66 | 0.19 | 0.197 | 0.1885 | 0.17 |
| | 49 | 0.173 | 0.18 | 0.169 | 0.1565 |
| | 32 | 0.195 | 0.2035 | 0.1915 | 0.1735 |
| | 15 | 0.577 | 0.6675 | 0.56 | 0.4285 |

From Tables 7 to 10, it may be found that as a result of checking the overvoltage according to the SOC, the overvoltage decreased in the case of a multilayer solid electrolyte film, and particularly, the solid electrolyte film that reduced the interface resistance of the cathode and anode layers at the same time exhibits the lowest overvoltage.

According to an aspect, the interface resistance between the anode layer and the solid electrolyte layer may be made lower than the current level to facilitate the movement of ions at high rate, thereby manufacturing an all-solid secondary battery having improved reversible capacity and improved capacity retention rate.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

The invention claimed is:

1. An all-solid secondary battery, comprising:
an anode layer;
a cathode layer; and
a solid electrolyte layer between the anode layer and the cathode layer,
wherein:
the cathode layer contains a large-particle cathode active material, a small-particle cathode active material, and a solid electrolyte,
the solid electrolyte layer includes a first solid electrolyte layer adjacent to the cathode layer and containing a first solid electrolyte, and a second solid electrolyte layer adjacent to the anode layer and containing a second solid electrolyte,
the second solid electrolyte has a larger size than the solid electrolyte of the cathode layer or the first solid electrolyte, and
the second solid electrolyte has higher ion conductivity than the first solid electrolyte.

2. The all-solid secondary battery of claim 1, wherein, in the cathode layer,
the large-particle cathode active material has a size of 14 μm or more, and
the small-particle cathode active material has a size of 6 μm or less.

3. The all-solid secondary battery of claim 1, wherein, in the cathode layer,
the large-particle cathode active material has a size of 14 μm to 20 μm, and
the small-particle cathode active material has a size of 3 μm to 5.5 μm.

4. The all-solid secondary battery of claim 1, wherein each of the solid electrolyte and the first solid electrolyte has a size of 3 μm or less.

5. The all-solid secondary battery of claim 4, wherein the solid electrolyte is a solid electrolyte having a size of 3 μm or less, and
the solid electrolyte is a solid electrolyte having a size of 1 μm to 3 μm, a solid electrolyte having a size of 1 μm or less, or a combination thereof.

6. The all-solid secondary battery of claim 5, wherein at least 80% by weight of the solid electrolyte is a solid electrolyte having a size of 1 μm or less.

7. The all-solid secondary battery of claim 1, wherein the second solid electrolyte is a solid electrolyte having a size of 3 μm to 10 μm, a solid electrolyte having a size of 1 μm to 3 μm, or a combination thereof.

8. The all-solid secondary battery of claim 1, wherein a solid electrolyte having a size of 1.0 μm or less or the first solid electrolyte is included in an interface between the cathode layer and the first solid electrolyte layer.

9. The all-solid secondary battery of claim 1, further comprising: a third solid electrolyte layer including a third solid electrolyte between the second solid electrolyte layer and the anode layer.

10. The all-solid secondary battery of claim 9, wherein the third solid electrolyte is a third solid electrolyte having a size of 3 μm or less, and
the third solid electrolyte is a solid electrolyte having a size of having a size of about 1 μm to about 3 μm, a solid electrolyte having a size of 1 μm or less, or a combination thereof.

11. The all-solid secondary battery of claim 9, wherein the third solid electrolyte having a size of 1.0 μm or less is included in an interface between the anode layer and the third solid electrolyte layer.

12. The all-solid secondary battery of claim 1, wherein a ratio (Z1/Z2) of a size Z1 of the solid electrolyte of the cathode layer and a size Z2 of the first solid electrolyte of the first solid electrolyte layer is about 0.33 to about 3.0.

13. The all-solid secondary battery of claim 1, wherein the solid electrolyte or the first solid electrolyte contains a compound having an argyrodite crystal structure and including chlorine (Cl), and
the second solid electrolyte contains a compound having an argyrodite crystal structure and including i) a halogen selected from Br, I, and a combination thereof, and ii) chlorine (Cl).

14. The all-solid secondary battery of claim 1, wherein the solid electrolyte or the first solid electrolyte includes a compound represented by Formula 1 and having an argyrodite crystal structure:

$$Li_aM_xPS_b(Cl)_d \qquad \text{<Formula 1>}$$

in Formula 1, M is Na, K, Fe, Mg, Ca, Ag, Cu, Zr, Zn, or a combination thereof,

X is Br, I, or a combination thereof, and $0 \leq x \leq 0.07$, a is a number from 5 to 6, b is a number from 4 to 6, $0 < d \leq 2$, and $5 \leq a+x \leq 6$.

15. The all-solid secondary battery of claim 1, wherein the second solid electrolyte includes a compound represented by Formula 2 and having an argyrodite crystal structure:

$$Li_aM_xPS_b(X1)_{c1}(Cl)_{d1} \qquad \text{<Formula 2>}$$

in Formula 2, M is Na, K, Fe, Mg, Ca, Ag, Cu, Zr, Zn, or a combination thereof,

X1 is Br, I, or a combination thereof, and $0 \leq x \leq 0.07$, a is a number from 5 to 6, b is a number from 4 to 6, $c1 > 0$, $d1 > 0$, $0 < c1+d1 \leq 2$, and $5 \leq a+x \leq 6$.

16. The all-solid secondary battery of claim 15, wherein $1.5 \leq c1+d1 \leq 2$.

17. The all-solid secondary battery of claim 1, further comprising: a third solid electrolyte layer including a third solid electrolyte between the second solid electrolyte layer and the anode layer, wherein the third solid electrolyte includes a compound represented by Formula 1 and having an argyrodite crystal structure:

$$Li_aM_xPS_b(Cl)_d \qquad \text{<Formula 1>}$$

in Formula 1, M is Na, K, Fe, Mg, Ca, Ag, Cu, Zr, Zn, or a combination thereof,

X is Br, I, or a combination thereof, and $0 \leq x \leq 0.07$, a is a number from 5 to 6, b is a number from 4 to 6, $0 < d \leq 2$, and $5 \leq a+x \leq 6$.

18. The all-solid secondary battery of claim 1, wherein the first solid electrolyte has an ion conductivity of about 1 mS/cm to about 5 mS/cm at 25° C., and the second solid electrolyte has an ion conductivity of about 3 mS/cm to about 7 mS/cm at 25° C.

19. The all-solid secondary battery of claim 1, wherein a thickness ratio of the first solid electrolyte layer and the second solid electrolyte layer is about 1:1 to about 1:10.

20. The all-solid secondary battery of claim 1, wherein the first solid electrolyte has a thickness of about 1 µm to about 35 µm, the second solid electrolyte has a thickness of about 10 µm to about 60 µm, a third solid electrolyte layer is further provided between the second solid electrolyte layer and the anode layer, and the third solid electrolyte layer has a thickness of about 1 µm to about 35 µm.

21. The all-solid secondary battery of claim 15, wherein the compound represented by Formula 2 is a compound represented by Formula 3:

$$(Li_{1-x1}M_{x1})_{7-y}PS_{6-y}(Br_{1-x2}(Cl)_{x2})_y \qquad \text{<Formula 3>}$$

in Formula 3, M is Na, K, Fe, Mg, Ca, Ag, Cu, Zr, Zn, or a combination thereof, and $0 \leq x1 < 1, 0 < x2 < 1$, and $0 \leq y \leq 2$.

22. The all-solid secondary battery of claim 15, wherein the compound represented by Formula 2 is a compound represented by Formula 4:

$$Li_aM_xPS_b(Br)_c(Cl)_d \qquad \text{<Formula 4>}$$

in Formula 4, M is Na, K, Fe, Mg, Ca, Ag, Cu, Zr, Zn, or a combination thereof,

X is Br, I, or a combination thereof, and $0 \leq x \leq 0.07$, a is a number from 5 to 6, b is a number from 4 to 6, $c > 0$, $d > 0$, $0 < c+d \leq 2$, and $5 \leq a+x \leq 6$.

23. The all-solid secondary battery of claim 14, wherein the compound represented by Formula 1 is $Li_{5.75}PS_{4.75}Cl_{1.25}$, $Li_{5.75}PS_{4.5}Cl_{1.5}$, $Li_{5.5}PS_{4.5}Cl_{1.5}$, $Li_{5.45}Na_{0.05}PS_{4.5}Cl_{1.5}$, $Li_{5.45}K_{0.05}PS_{4.5}Cl_{1.5}$, $Li_{5.74}PS_{4.74}Cl_{1.26}$, $LiNa_{0.05}PS_4Cl_2$, $Li_5K_{0.05}PS_4Cl_2$, $Li_{5.8}PS_{4.8}Cl_{1.2}$, $Li_{5.7}Na_{0.05}PS_{4.75}Cl_{1.25}$, $Li_{5.7}Cu_{0.05}PS_{4.75}Cl_{1.25}$, $Li_{5.65}Cu_{0.1}PS_{4.75}Cl_{1.25}$, or a combination thereof.

24. The all-solid secondary battery of claim 15, wherein the compound represented by Formula 2 is $Li_{5.5}PS_{4.5}Cl_{0.75}Br_{0.75}$, $Li_{5.5}PS_{4.5}Cl_{0.25}Br_{1.25}$, $Li_{5.5}PS_{4.5}Cl_{1.25}Br_{0.25}$, $Li_{5.5}PS_{4.5}Cl_{0.1}Br_{1.4}$, $Li_{5.45}Na_{0.05}PS_{4.5}Cl_{0.25}Br_{1.25}$, $Li_{5.5}PS_{4.5}Cl_{0.25}Br_{1.25}$, $Li_{5.45}Na_{0.05}PS_{4.5}Cl_{0.1}Br_{1.4}$, $Li_{5.45}Na_{0.05}PS_{4.5}Cl_{0.1}Br_{1.4}$, $LiNa_{0.05}PS_4Cl_{0.01}Br_{1.99}$, $Li_{5.74}PS_{4.74}Cl_{0.01}Br_{1.25}$, $Li_5PS_4Cl_{0.01}Br_{1.99}$, $Li_{5.45}K_{0.05}PS_{4.5}Cl_{0.25}Br_{1.25}$, $Li_{5.45}K_{0.05}PS_{4.5}Cl_{0.1}Br_{1.4}$, $Li_{5.45}K_{0.05}PS_{4.5}Cl_{0.1}Br_{1.4}$, $Li_5K_{0.05}PS_4Cl_{0.01}Br_{1.99}$, or a combination thereof.

25. The all-solid secondary battery of claim 1, wherein each of the first solid electrolyte layer and the second solid electrolyte layer contains at least one binder selected from styrene-butadiene-styrene copolymer, acrylic resin, styrene-butadiene rubber (SBR), polytetrafluoroethylene (PTFE), polyvinylidene fluoride (PVDF), polyethylene, vinylidene fluoride/hexafluoropropylene copolymer, polyacrylonitrile, and polymethylmethacrylate.

26. The all-solid secondary battery of claim 1, wherein the anode layer includes a first anode active material layer including an anode current collector and an anode active material on the anode current collector, and the anode active material includes at least one selected from a carbon-based anode active material and a metal or metalloid anode active material.

27. The all-solid secondary battery of claim 26, wherein the carbon-based anode active material includes at least one selected from amorphous carbon and crystalline carbon, and the metal or metalloid anode active material includes at least one selected from gold (Au), platinum (Pt), palladium (Pd), silicon (Si), silver (Ag), aluminum (Al), bismuth (Bi), tin (Sn), and zinc (Zn).

28. The all-solid secondary battery of claim 26, further comprising: a second anode active material layer between the anode current collector and the first anode active material layer and/or between the solid electrolyte layer and the first anode active material layer, wherein the second anode active material layer is a metal layer containing lithium or a lithium alloy.

29. The all-solid secondary battery of claim 1, wherein the content of a solid electrolyte in the cathode layer is about 2 parts by weight to about 70 parts by weight based on 100 parts by weight of the cathode active material.

30. A method of manufacturing an all-solid secondary battery, the method comprising:

providing a cathode layer containing a solid electrolyte;

providing an anode layer;

preparing a first solid electrolyte layer and a second solid electrolyte layer using a composition for the first solid electrolyte layer, the composition containing a first solid electrolyte and a binder, and a composition for the second solid electrolyte layer, the composition containing a second solid electrolyte and a binder, respectively; and sequentially stacking the cathode layer, the first solid electrolyte layer, the second solid electrolyte layer, and the anode layer to manufacture the all-solid secondary battery of claim 1.

31. The method of claim 30, wherein, in the preparing of the first solid electrolyte layer and the second solid electrolyte layer, the composition for the first solid electrolyte layer and the composition for the second solid electrolyte layer are applied onto a substrate and heat-treated to prepare the first solid electrolyte layer and the second solid electrolyte layer.

32. The method of claim 30, wherein:

the solid electrolyte and first solid electrolyte are prepared:
- by atomizing each precursor to 3 μm or less to obtain an atomized solid electrolyte precursor and
- heat-treating the atomized solid electrolyte precursor at about 350° C. to 500° C., and the second solid electrolyte are prepared by atomizing each precursor to 6 μm or less to obtain an atomized solid electrolyte precursor and heat-treating the atomized solid electrolyte precursor at about 350° C. to 500° C.

* * * * *